United States Patent [19]

Gokey et al.

[11] 4,353,077

[45] Oct. 5, 1982

[54] OPTICAL FLOPPY DISC DATA STORAGE AND RETRIEVAL TECHNIQUES

[75] Inventors: Phillip E. Gokey; Donovan W. Hurlbut; Emma L. Sederholm; Angel F. Terry; Alan A. Jewer, all of Whitewater, Wis.

[73] Assignee: News Log International, Inc., Fort Atkinson, Wis.

[21] Appl. No.: 74,095

[22] Filed: Sep. 10, 1979

[51] Int. Cl.³ .............................................. G01D 15/24
[52] U.S. Cl. .................................... 346/137; 369/272
[58] Field of Search ................... 353/25, 27 R22, 120; 358/102, 128.5, 129, 130, 132, 231; 179/100.1 G, 100.3 V; 350/241; 354/15, 120, 16, 121; 355/2, 54; 369/103, 111, 180, 272, 273, 275; 346/33 A, 102, 135.1, 137; 235/454, 487, 494; 364/200 MS File, 900 MS File

[56] References Cited

U.S. PATENT DOCUMENTS

| | | | |
|---|---|---|---|
| 3,404,224 | 10/1968 | Revelo et al. | 358/128.5 |
| 3,781,809 | 12/1973 | Murakoshi et al. | 364/900 |
| 3,931,457 | 1/1976 | Mes | 358/128.5 |
| 3,939,302 | 2/1976 | Kihara | 358/130 |
| 4,168,889 | 9/1979 | Norris | 354/16 |
| 4,189,783 | 2/1980 | Brodie et al. | 369/111 X |
| 4,209,804 | 6/1980 | Dil | 369/275 |

*Primary Examiner*—Gareth D. Shaw
*Assistant Examiner*—Thomas M. Heckler
*Attorney, Agent, or Firm*—Hill, Van Santen, Steadman, Chiara & Simpson

[57] ABSTRACT

An optical floppy disc constructed of microfilm, thermoplastic or paper and bears digital and/or graphic information. Digital information may be stored in radial lines each of which comprises the digital information to be retrieved and line addresses at the end of a line or dispersed within a line. Digital information may also be stored in a plurality of coaxial circular tracks and be retrieved by addressing the track and portion of the track containing the desired information. Information retrieval systems, both continuously rotating and start-stop systems are provided for reading the various types of discs. Of particular importance is the use of a disc as an easily up-dateable catalog.

12 Claims, 14 Drawing Figures

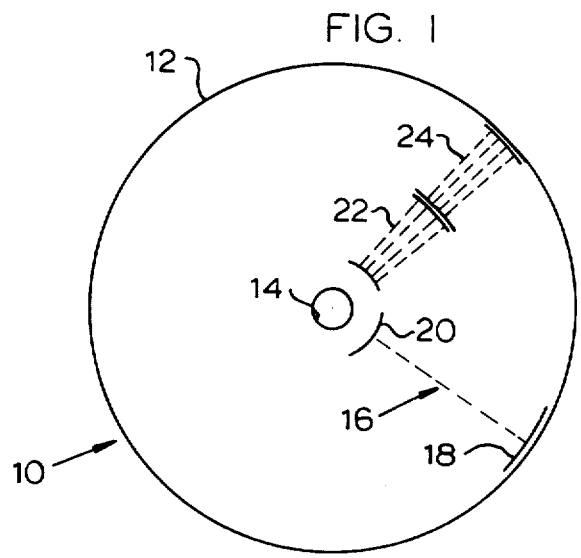
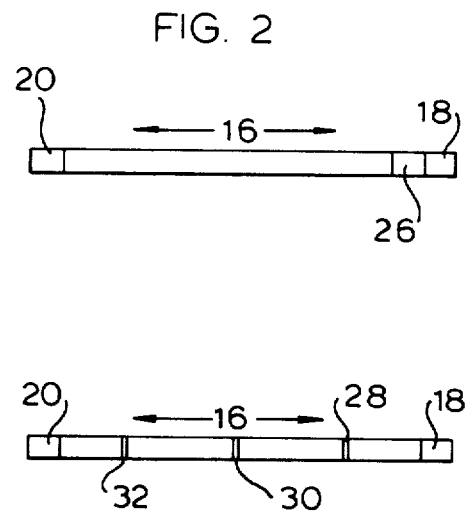
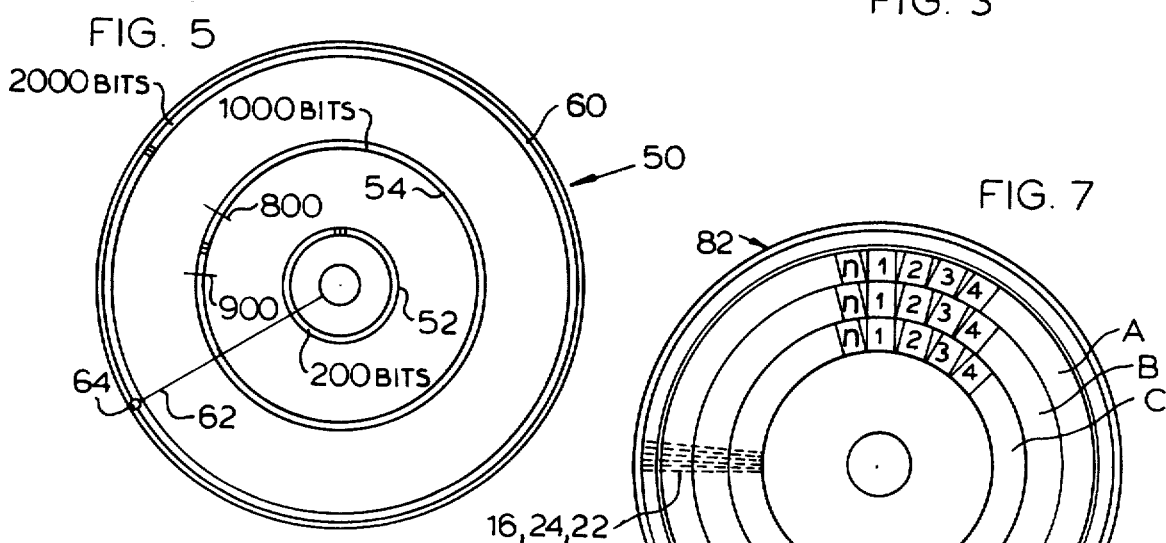
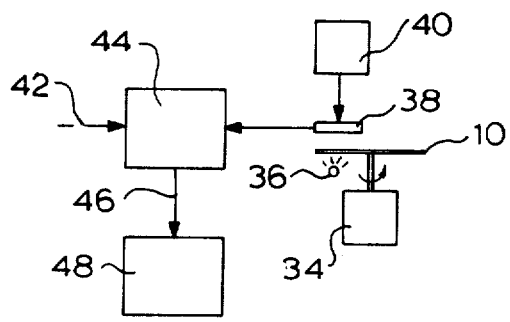
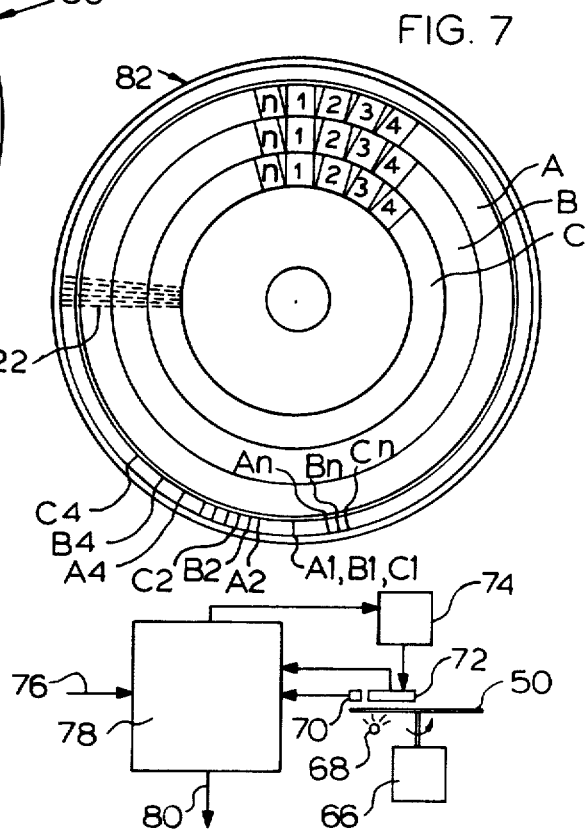

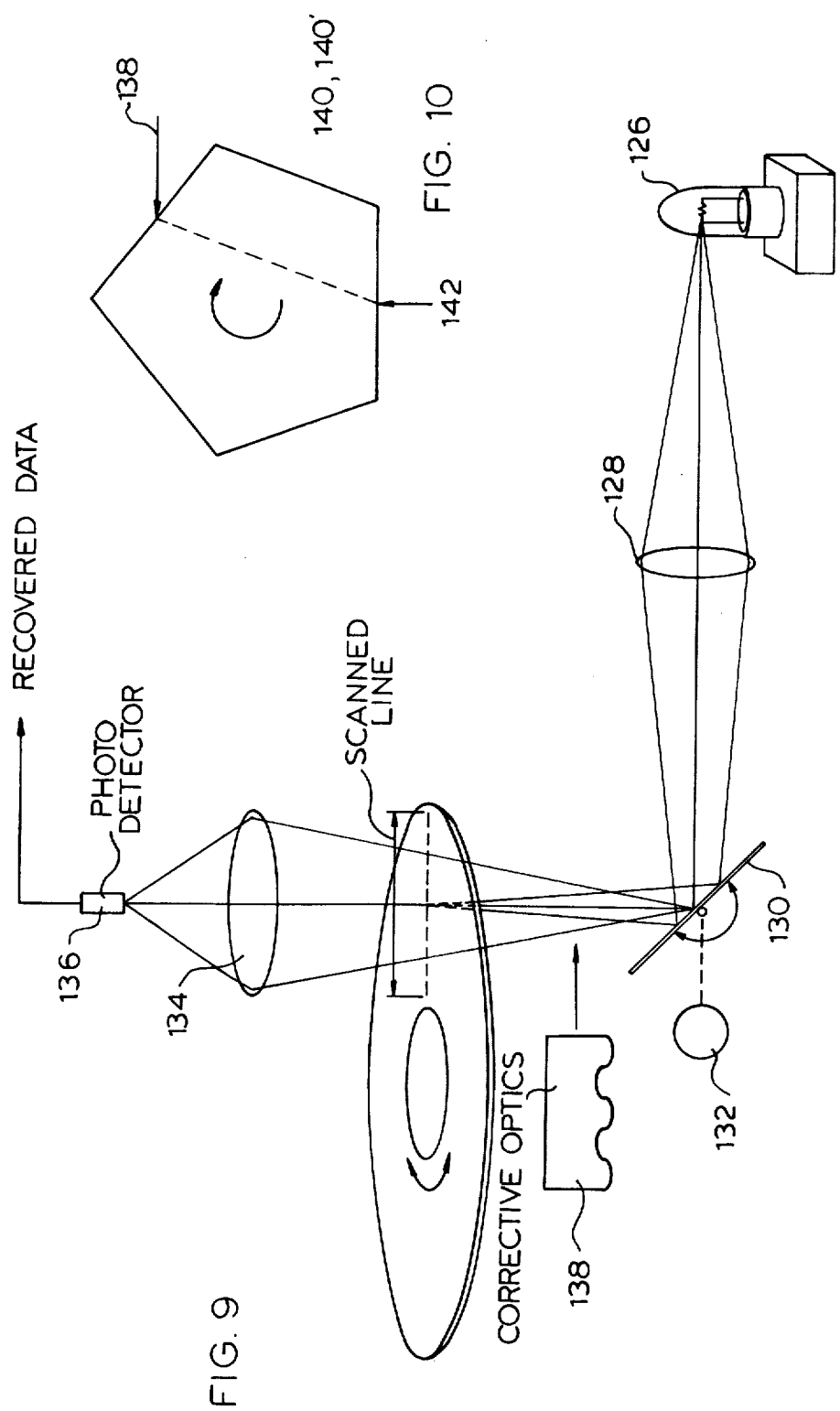

INDEX ROUTINE

CONSOLE COMMAND PROCESSOR

RETRIEVE DATA ROUTINE

MICROPROCESSOR DATA RECOVERY & TIMING

OPTICAL FLOPPY DISC DATA STORAGE AND RETRIEVAL TECHNIQUES

CROSS REFERENCE TO RELATED APPLICATIONS

This application is related to co-pending applications, assigned to the same assignee, namely Ser. No. 922,798, filed July 7, 1978, now U.S. Pat. No. 4,213,040 and Ser. No. 956,426, filed Oct. 31, 1978, now U.S. Pat. No. 4,254,329.

BACKGROUND OF THE INVENTION

1. Field of the Invention

The present invention relates to communications systems, and more particularly to microfilm systems in which data is stored in digital and/or graphic form on a circular storage media, such as microfilm, thermoplastics or paper, and is optically scanned by light transmission, light reflection or light refraction apparatus.

2. Description of the Prior Art

In Gokey et al Ser. No. 922,798, filed July 7, 1978 and Gokey et al Ser. No. 956,426, filed Oct. 31, 1978, a microfiche system is disclosed in which a microfiche card bears digitally encoded information and is read by an optical scanner which indexes the card to a desired address and optically scans the data content at that address. Also disclosed in these applications is a viewer microfiche, bearing graphic information (including drawings, alphanumeric, etc, other than digital information) which is addressed by digital codes for viewing on a screen. Each of the microfiche, both the digital microfiche and the viewer microfiche, were provided with indicia to correct for skew and to provide tracking alignment.

Murakoshi, in his U.S. Pat. No. 3,792,440, discloses a film disc memory which photographically stores clock signals in the radial direction and index signals in the circular direction to control the x-y movement of a microfiche transport to properly position a desired frame in the light path of a viewer.

SUMMARY OF THE INVENTION

It is an object of the present invention to store and retrieve information of the type set forth in the Gokey et al applications on a microdisc such that skew and tracking indicia are obviated.

Another object of the invention is to provide an economical data storage and retrieval system which may readily be constructed of presently available components and which is, in both construction and operation, cost effective and highly versatile.

Another object of the invention is to provide an information storage and retrieval system in which both digital information and graphic information may be stored on and retrieved from the same disc.

As used herein, the term disc refers to a storage medium which may be microfilm, thermoplastic (diazo), paper or the like, and optical scanning may therefore include light reflection, light refraction or light transmission. However, for the sake of simplicity, only microfiche storage and light transmission reading are discussed herein.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a plan view of a digital optical floppy disc which bears digital information along radial lines thereof;

FIG. 2 is a graphic illustration of the distribution of data along a radial line, including a pair of flags and a line address;

FIG. 3 is another graphic illustration of a different data distribution along a radial line, including a pair of flags and distributed address information;

FIG. 4 is a simplified block diagram of a system for retrieving data from a disc of the type illustrated in FIG. 1;

FIG. 5 is a plan view of an optical floppy disc which bears digital information in circular tracks and which has a radial index to be read by a separate index sensor;

FIG. 6 is a simplified schematic diagram of apparatus for retrieving data from a disc of the type illustrated in FIG. 5;

FIG. 7 is a plan view of an optical floppy disc storing graphic information and digital information;

FIG. 9 illustrates an embodiment of a different scanner for use with a system of FIG. 7;

FIG. 10 illustrates another embodiment of the scanner of FIG. 9, with two variations, namely a polygonal mirror arrangement and a polygonal prism arrangement;

DESCRIPTION OF THE PREFERRED EMBODIMENTS

Figure 8:
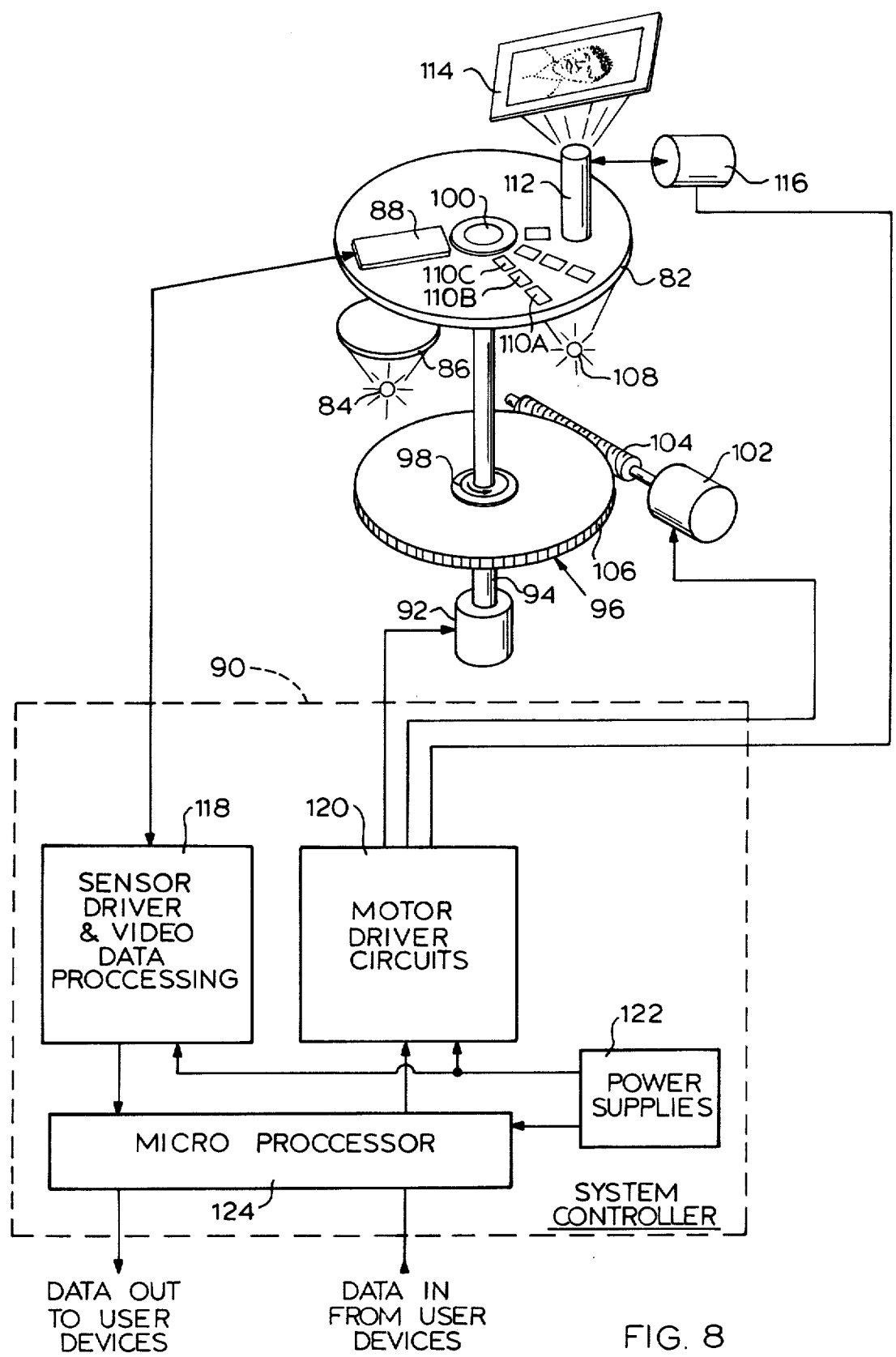
FIG. 8 is a diagrammatic and schematic illustration of a system for reading a digital disc, a viewer disc, or a combination digital/viewer disc.

Inasmuch as the drive apparatus for the microdisc may be constructed from a diskette or floppy disc drive, constructed to run at, for example, 24 or 30 RPM, and inasmuch as only the microfiche type of microdisc is discussed in detail herein, the disc will be referred to as an optical floppy disc.

Referring to FIG. 1, an optical floppy disc is generally illustrated at 10 as having a peripheral edge 12 and a hub opening 14 for clamping the same in a disc drive. Digital text is generally illustrated at 16 as extending between a pair of flags 18 and 20. A plurality of such radially extending lines of data are provided about the disc, only one being illustrated for purpose of simplicity.

In the alternative, the disc may have a plurality of information bands, as illustrated at 22 and 24, each of which bands includes a plurality of radially extending lines of digital data.

As illustrated in FIG. 2, the text 16 may comprise a beginning flag 18, a terminal flag 20, and an address 26 which may comprise a plurality of bits.

As illustrated in FIG. 3, it is not necessary for the address 26 to be located in a particular position along the data line, but may be dispersed within the data line, as illustrated at 28, 30 and 32, it only being necessary that sensor cells be assigned to the specific address locations.

On a 4" disc, 256 bits/line were provided with a 6 mill bit spacing, including flags, and a 6 mill radial bit length. Many codes may be used, and in a particular construction, an 8-bit Ascii code was employed.

An optical floppy disc of the type illustrated in FIG. 1 may be driven continuously and optically scanned to provide the desired output data, as illustrated in FIG. 4 in which the disc 10 is driven at a constant speed by a drive motor 34 and is illuminated by a lamp 36. An optical sensor, such as a Reticon RL-1728H, manufactured by Reticon Corporation, Sunnyvale, Calif., may be driven by a sensor driver 40, to radially scan each radial line as it passes beneath the sensor, so that the sensor 38 constantly loads the information of each line, bit-by-bit, and line-by-line, into a comparison device 44. The comparison device 44 receives an address by way of an input 42 and compares the desired address with the addresses and respective data received from the sensor 38. Upon address agreement, the comparison device 44 feeds the information by way of an output 46 to a utilization device 48, such as a display unit, which may include a decoder.

FIG. 5 illustrates a circular data storage format by which twice the bit density may be achieved over radial bit orientation, for a given size of disc.

In FIG. 5, an optical floppy disc is generally illustrated at 50 as comprising a plurality of circular tracks, only three of which are illustrated, namely the tracks 52, 54 and 60.

As an illustration, the track 52 may contain 200 bits, the track 54 may contain 1000 bits and the track 60 may contain 2000 bits. In order to access the desired information, for example the information between bits 800 and 900 in the track 54, the disc 50 is also provided with an index 62 which defines a zero point for all tracks. The index 62, since the same is radial, may be read by a single photocell, as indicated at 64. As the disc rotates, therefore, the address of the desired information tells the system to enable the sensor cell associated with the track 54, to read all bits on the track 54, to throw away bits 1–799 and bits 901–1000 and maintain bits 800–900. This is accomplished through a simple counting process all referenced to the index 62.

FIG. 6 illustrates in an extremely simplified form, a system for reading the information on an optical floppy disc of the type illustrated in FIG. 5. In FIG. 6, an optical floppy disc 50 is constantly rotated by a drive motor 66 and is illuminated by a lamp 68. The index 62 of FIG. 5 is sensed by a separate photocell 70 once each revolution to inform a control circuit 78 of the exact position of the disc. The control circuit 78 receives an address at 76 which includes a track selection, for example the track 54, and the desired bits on the track to inform an internal counter in the control circuit 78. Inasmuch as the track selection circuit 74 only permits that portion of the sensor 72 associated with the track 54 to feed data to the control circuit 78, and as the counter has been instructed to throw away the bits prior to and subsequent to the desired data, only the desired data is output at 80 for further utilization, such as for decoding and display.

Up to this point, the optical floppy disc has been a continuously rotating disc, although the disc 10 of FIG. 1 could be read in a start-stop mode of operation in which the disc is moved to the desired address, stopped and read. Also, up to this point, only a digital structure has been discussed. The microdisc, preferably in the form of an optical floppy disc, may also bear graphic information, such as pictures, drawings, alphanumerical information or the like, in which case the start-stop mode is preferred. Referring to FIG. 7, an optical floppy disc 82 is generally illustrated as comprising a plurality of pictures arranged in a plurality of circular bands, here the bands A, B and C, so that the pictures are located at A1–An, B1–Bn and C1–Cn, each of which has a peripherally arranged address which lies at a predetermined angle with respect to the physical location thereof, here 180°. The angle is arbitrary and depends upon the particular construction of the reader. The reader, therefore, when addressed, rotates the disc 82, scans for the desired address, and positions the desired graphic information angularly with respect to a projection system. The projection system is a multi-position system, designed for radial movement, depending upon which band is selected, A, B or C, as will be evident from the discussion below.

As indicated in FIG. 7, digital data may be interspersed with the graphic information or placed in a separate area on the disc, and formed as in FIG. 1, as indicated at 16, 22, 24.

A disc of the type illustrated in FIG. 7 is shown in FIG. 8 in a system which is designed to read all of the types of discs discussed above, depending upon the type of drive employed and the programming provided to a system controller. A start-stop operation is, of course, preferred for the viewer-type optical floppy disc and will be discussed immediately below, followed with a discussion of modifications for reading discs of the type illustrated in FIG. 1 and FIG. 5 with a continuous rotation of such discs.

In FIG. 8, an optical floppy disc 82 is illustrated in the environment of a reader which includes both a digital scanner and an optical projection system.

As to the scanner, a light source 84 is provided on one side of the disc to direct light through a collimating lens 86 and through the disc 82 for scanning by an optical sensor, such as the aforementioned Reticon RL-1728H, or a Fairchild CCD 110. The sensor 88 is controlled to scan radially of the disc and reads the digital information back to a system controller 90, which operates via a program to control a coarse positioning motor 92, either a d.c. motor or a stepping motor, and a fine or vernier stepping motor 102 for fine positioning.

The motor 92 is connected to a shaft 94 which mounts a gear 96 by way of an overrunning clutch 98, and which has a hub (not shown) for clamping the disc 82, in cooperation with the disc clamp (not shown) at 100, as is well known to those skilled in the magnetic diskette art. The clutch may be, for example, a model JB-L-57, manufactured by the Winfred M. Berg Co., East Rockaway, Long Island, N.Y.

The vernier stepping motor 102 operates a worm gear 104 which is engaged with teeth 106 of the gear 96 for fine positioning.

Referring to the projection system, a light source 108 projects light through the disc 82 and through a projection lens system 112 to image on a viewer screen, projection screen or television camera, symbolically illustrated at 114. The projection lens 112 is positioned to one of a plurality of radial positions, in accordance with the address, by a three-position actuator 116.

All of the foregoing operations are under the control of the system controller 90 and a program stored therein. The system controller 90 comprises a sensor driver and video data processing unit 118, motor driver circuits 120, system power supplies 122 and a microprocessor 124, and will be discussed in greater detail below.

Suffice it here to say that the data input from a user activates the system controller to cause the motors 92 and 102 to position the disc 88 at a desired location. Then, the light sources 84 and 108 are switched on by the controller (not shown) or the light paths thereof are de-blanked by electromechanical apparatus (not shown) as well known to those skilled in the art, and the digital and/or graphic information is read via the sensor 88 and the projection and viewing apparatus 112, 114. The digital information read by the sensor 88 is processed and output to the user and this information is available in conjunction with the graphic information displayed by the device 114.

The scanner apparatus 84, 86, 88 may be replaced by a flying spot type scanner of the type illustrated in FIG. 9 which comprises a light source 126, a lens 128, a mirror 130 which is oscillated at the scan frequency by a servo motor 132, a corrective optics 138 for correcting the variable scan path length, a lens 134 and a photodetector 136. With the flying spot scanner, and in a system for continuously rotating the disc, assuming a disc of the type illustrated in FIG. 1, the scan path may be skewed with respect to the data lines in order to obtain higher speeds.

Another flying spot scanner is illustrated in FIG. 10 and has two variations.

In the first variation, a constantly rotating pentagonal mirror 140 replaces the servo components 130, 132 and receives a light beam 138 for effecting the scan.

In the second variation, a polygonal element 140', depending on the refractive properties of the material employed, receives a coherent beam 142, as from a laser, and bends the beam, through refraction, prior to the same exiting the element 140'.

Figure 12:
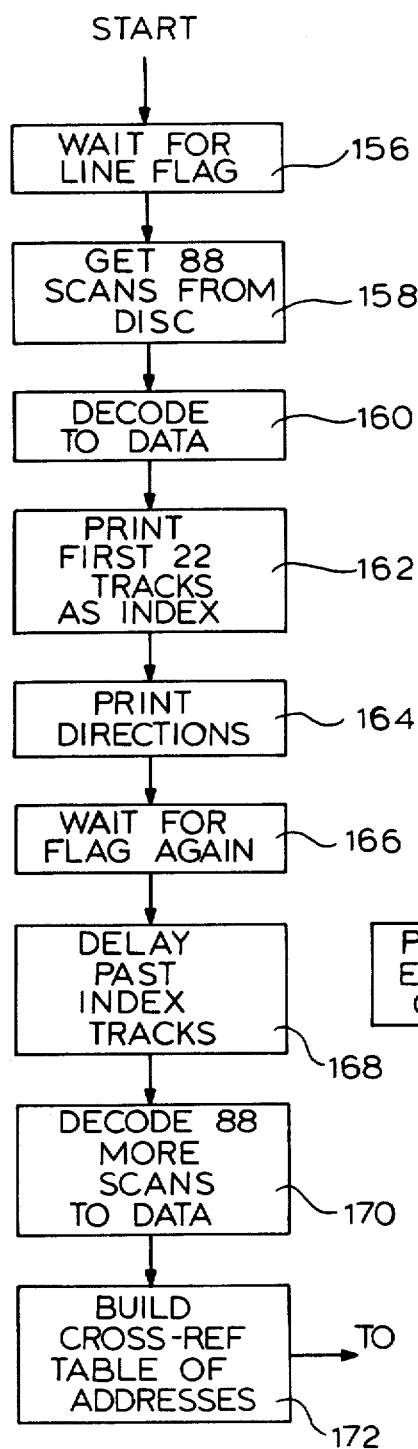
FIGS. 11, 12, 13 are flow charts for the command processing, the index routine and the data retrieval routine as employed in a model of the system embodying the principles of the present invention.
Figure 11:
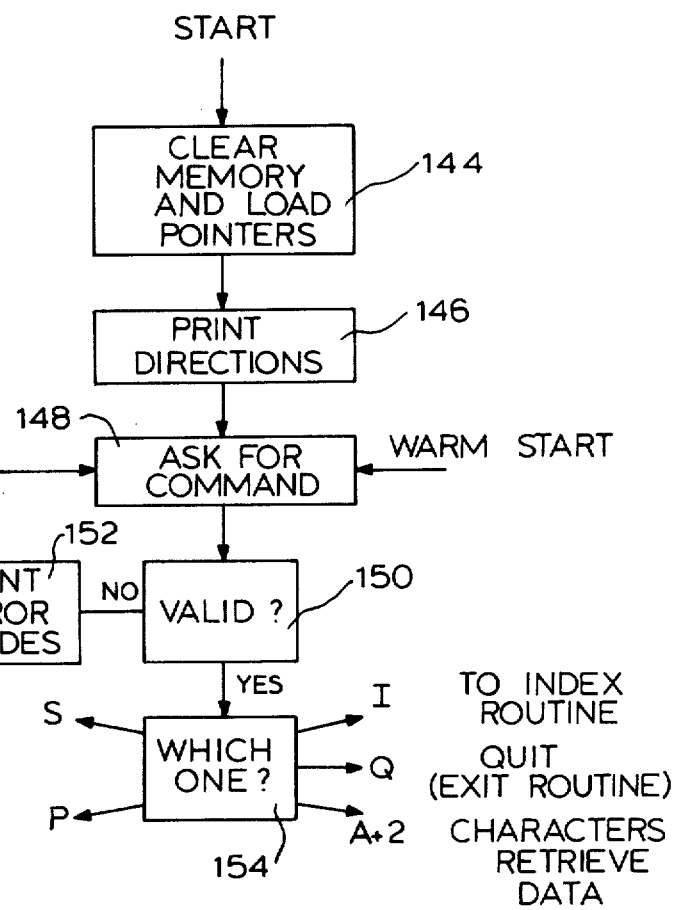
Figure 13:
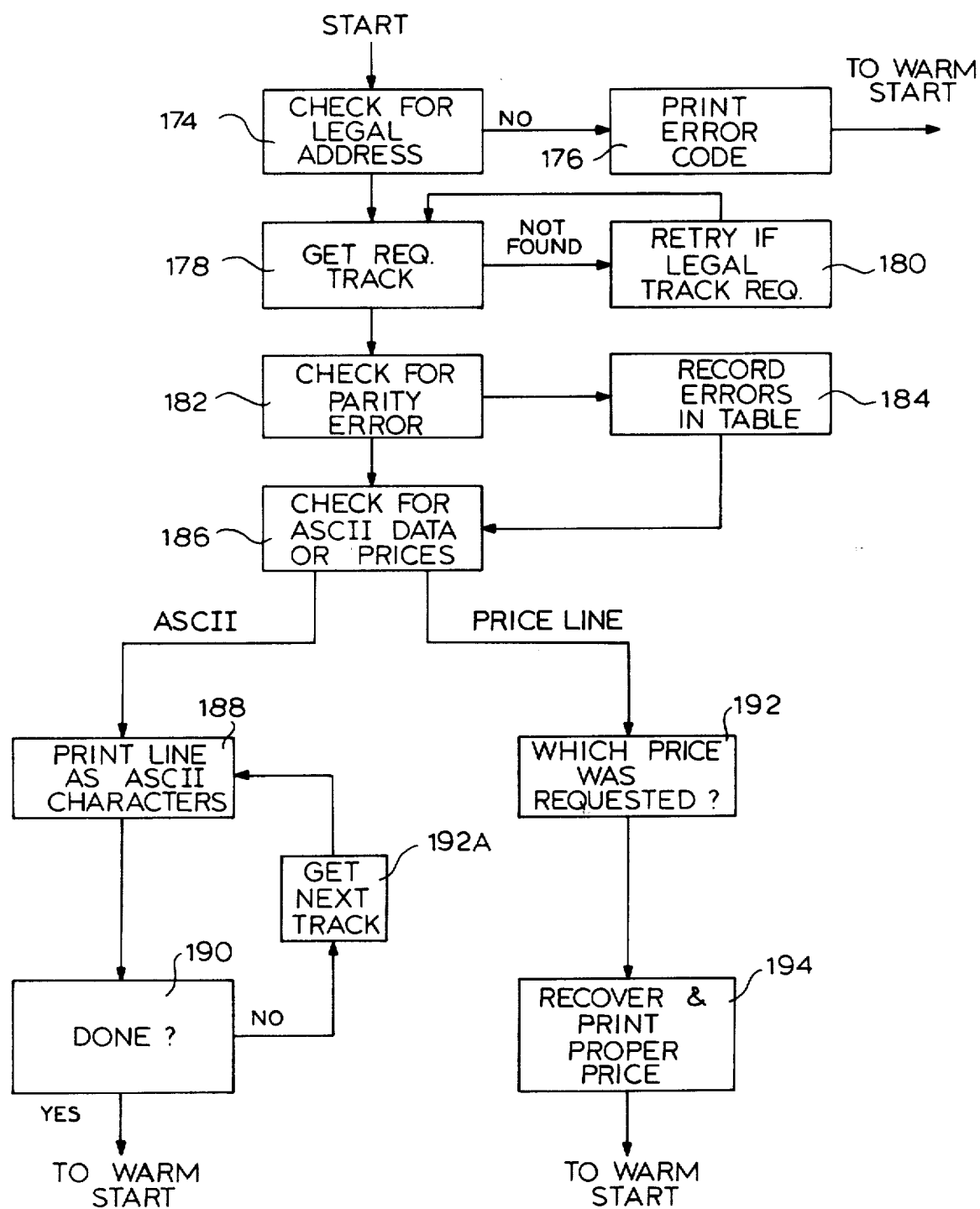

Referring back to FIG. 8, an optical floppy system was built and operated in which the projection components were not employed. Also, the motor 92 was a continuously operating motor and data of the type illustrated in FIG. 1 was retrieved. The flow charts of FIGS. 11, 12 and 13 illustrate the console command processor operations, the index routine and the data retrieve routine for that system. The block diagram of FIG. 14 complements these flow charts and illustrates the system controller 90 as employed in the test model. It should be pointed out that the test model was operated locally via an ASCII keyboard and remotely via telephone lines. As mentioned above, the flow charts show only portions of the system operation and the entire process is set forth below by way of the program utilized in the controller.

Referring to FIGS. 11–14, the console command operations are initiated with a start input to clear the memory and load pointers into the system, as indicated at 144. Directions are then printed at 146 and the system asks for a command at 148. If the command is determined valid at 150, a determination of the correct routine is provided at 154. If the command is not valid, a loop asking for a second command is provided, including a printing of error codes at 152.

In this example, the index routine receives a start instruction and the system operates in response to receipt of a flag at 156 to obtain 88 scans from the disc at 158. This scan information is decoded to data 160 and the first 22 tracks are printed as index information 162. The system then prints directions 164 and waits for a second flag 166, the system then delays past the index tracks 168, decodes 88 more scans to data and compiles a cross-referenced table of addresses at 172. At the conclusion of the index routine, a warm start signal is provided back to the command process to initiate a request for another command. Upon receiving a start indication for the data retrieval routine, the system checks for a legal address at 174 and, if the same is not found, a print error code is initiated at 176 and a warm start is again provided to ask for another command at 148.

Assuming a correct address, the requested track is obtained at 178, and a retry loop is provided, at 180, if the requested track is not found.

The system then checks for parity errors at 182, records such errors in a table 184 and provides the same to check for ASCII data or prices 186. It should be mentioned that this particular system was designed to output ASCII information or digital information which relates to prices of spare parts of equipment, such as farm equipment.

If ASCII is output, ASCII characters are printed at 188 and a determination is made at 190 as to whether the entire ASCII information has been obtained. If the ASCII information has been completely obtained, a warm start is sent to the console command processor; if not, the next track is obtained at 192.

In a case in which price line information is output, a determination is made as to which price was requested, at 192, and the output data is recovered and the proper price is printed, before a warm start is again indicated.

Figure 14:
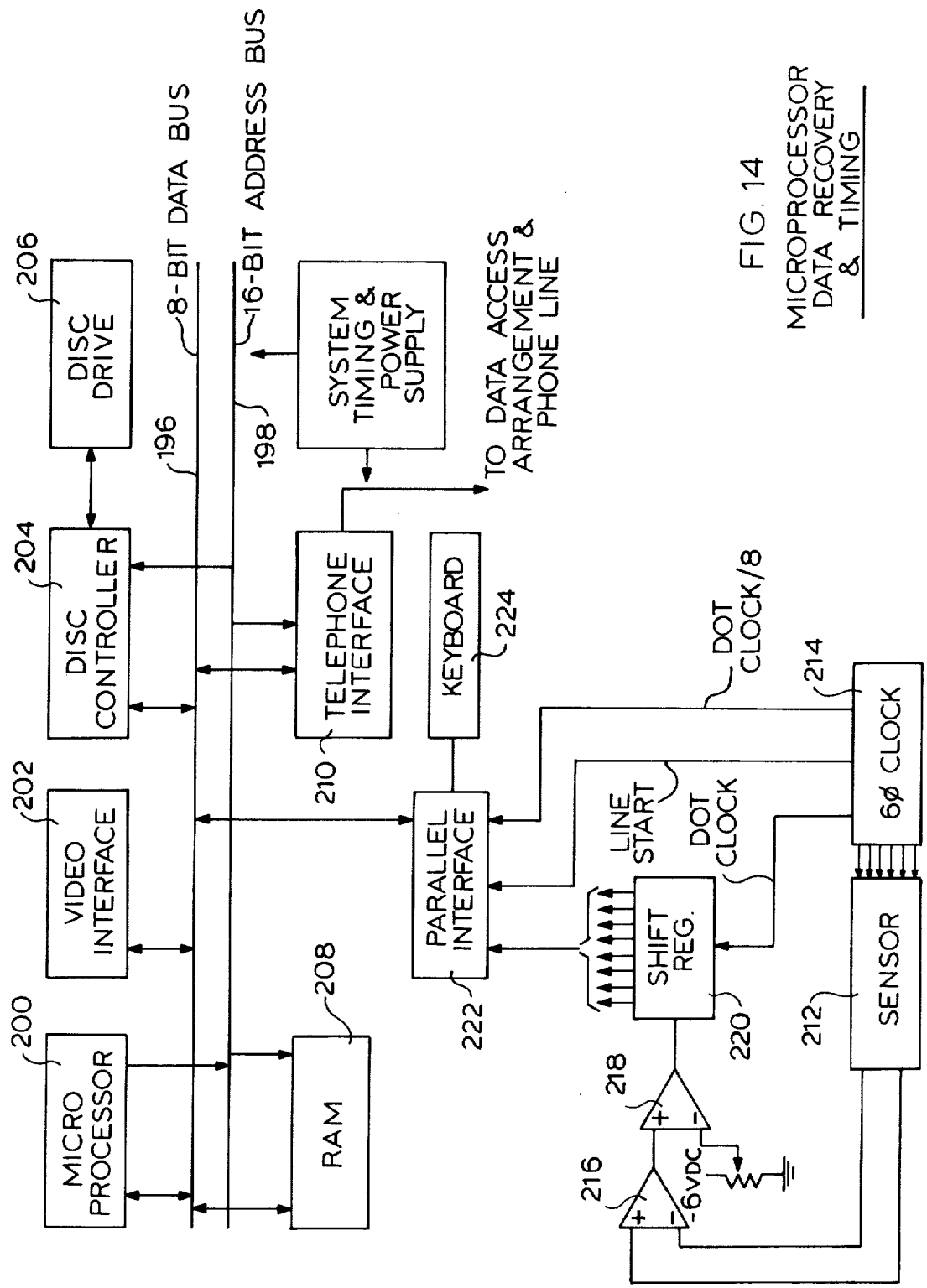
FIG. 14 is a schematic block diagram of a microprocessor and the data recovery and timing circuits employed in practicing the invention in accordance with the flow charts of FIGS. 9–11.

Referring to FIG. 14, in particular, the microprocessor data recovery and timing circuits are illustrated as comprising a plurality of components which are interconnected by way of an 8-bit data bus 196 and a 16-bit address bus 198. These components include a microprocessor 200, a video interface 202, a disc controller 204 for controlling a disc drive 206, a random access memory 208, a telephone interface 210, a sensor 212, driven by a 6φ clock 214, and 8-bit shift register (serial in-parallel out) 220, an operational amplifier 216, an operational amplifier 218, a parallel interface 222 and an ASCII keyboard 224. In addition system timing and power supplies are, of course, included.

The following table sets forth the component employed in the structure of FIG. 14, their manufacturers and model numbers.

| REF NO. | NAME | MODEL NO. & MFG. |
|---|---|---|
| 200 | Microprocessor | Zilog Z-80, Zilog Cupertino, California |
| 202 | Video Interface | IMSAI VIO, IMS Associates, Inc. California |
| 204 | Disc Controller | IMSAI DIO, IMS Associates, Inc. California |
| 206 | Floppy Disc Unit | PerSci, Inc. Marina Del Rey, California |

-continued

| REF NO. | NAME | MODEL NO. & MFG. |
|---|---|---|
| 208 | Random Access Memory (384 units, 49,152 Bytes) | Type 2102-IL, National Electric Co., (NEC), Japan |
| 210 | Telephone Interface | D.C.Hayes Telephone Interface Card |
| 212 | SENSOR | RL-17284, Reticon Corporation, Sunnyvale, California |
| 214 | 60 Clock | Custom Built by Newslog International, Inc., Whitewater, Wisconsin |
| 216 | Op-Amp(High Gain,Low Noise,High Speed) | CAIOA, Reticon Corporation Sunnyvale, California |
| 218 | Op-Amp(High Speed) | LM311, National Semiconductor Santa Clara, California |
| 222 | Parallel Interface | IMSAI PIO-6-6, IMS Associates, Inc. California |

In addition an ASCII keyboard and a S-100 bus system was employed.

In a slightly different form, the system was constructed using the following components.

| Quantity | Component |
|---|---|
| 1 | Technical Design Laboratories 280 CPU Card |
| 1 | IMSAI 8080 Frzme/Power Supply (modified) |
| 2 | Vector Graphics 8K, 250 ns Semiconductor Memory |
| 4 | Digital Research 8K, 250 ns Semiconductor Memory |
| 1 | Custom Built 3k, 250 ns Semiconductor Memory |
| 1 | Cromenco 8K EPROM Memory Board |
| 1 | IMSAI MIO Multiple I/O Board |
| 1 | Processor Technology 3P + S I/O Card |
| 1 | Processor Technology VDMI 16 × 64 Video Display Card |
| 1 | IMSAI PIO 6—6 Parallel Interface Card |
| 1 | IMSAI Intelligent Breadboard |
| 1 | IMSAI VIO 24 × 80 Video Display Card |
| 1 | Sanyo 14 inch Video Monitor |
| 1 | IMSAI DIO Disc Controller and Data Separator |
| 1 | PerSci 277 Dual 8 inch Floppy Disc Drive |
| 1 | D.C. Hayes Auto Dial/Answer Modem |
| 1 | Custom Built System Timing Card |
| 1 | ASCII Keyboard |

In order for one skilled in the art to better understand the invention, the model system discussed above was operated in accordance with the following program. Of course, for different modes of operation, and different types of discs, such as circular format and graphic information, other programs may be used. It should be pointed out that this particular program was set up for 30 rpm or 24 rpm operation of the disc drive and for operation with either IMSAI or NYLAC components.

```
;             MICROFICHE READER SOFTWARE
;                    AAJ 5/22/79
;
;**************************************
;*                                    *
;*            FDOS EQUATES            *
;*                                    *
;**************************************
;
0005    FDOS    = 5      ;SYSTEM CALL ADDRESS
0001    CONIN   = 1      ;INPUT CON: CHARACTER TO A
0002    CONOUT  = 2      ;OUTPUT CON: CHARACTER FROM E
0005    LISTOUT = 5      ;OUTPUT TO LST: CHARACTER FROM E
0009    PRINT   = 9      ;OUTPUT STRING (DE) TO CON:
000A    INLINE  = 10     ;INPUT LINE FROM CON:
000B    CONRDY  = 11     ;INTERROGATE CONSOLE READY
;
;            DISK FILE I/O
;
000F    OPEN    = 15     ;OPEN FILE (FCB IN DE)
0013    DELETE  = 19     ;DELETE FILE (FCB IN DE)
0016    MAKE    = 22     ;CREATE FILE (FCB IN DE)
001A    SETBUF  = 26     ;SET BUFFER ADDRESS TO (DE)
0014    READ    = 20     ;READ (NEXT) RECORD (FCB IN DE)
0015    WRITE   = 21     ;WRITE (NEXT) RECORD (FCB IN DE)
0010    CLOSE   = 16     ;CLOSE FILE (FCB IN DE)
0017    RENAME  = 23     ;RENAME FILE (FCB IN DE)
0011    SEARCH  = 17     ;SEARCH FOR AFN (FCB IN DE)
;
;       FCB (FILE CONTROL BLOCK)
;
;         0:             DRIVE NUMBER (0 FOR CURRENT DRIVE)
;       1-8:             FILE NAME, BLANK FILLED
;      9-11:             FILE TYPE, BLANK FILLED
;        12:             EXTENT - INITALIZED TO ZERO BY USER
;     13-14:             INITALIZE TO ZERO
;        15:             RECORD COUNT - HANDLED BY DOS
;     16-31:             DISK MAP - HANDLED BY DOS
```

```
;         32:              RECORD NUMBER - IGNORE FOR SEQUENTIAL
;         33:              DESIRED EXTENT - RANDOM ACCESS ONLY
;
;
; BDOS MEMORY LOCATIONS
;
;          0:              JMP HERE TO EXIT PROGRAM
;          3:              IOBYTE
;          5:              CALL HERE FOR SYSTEM CALL WITH FUNCTION
;                          NUMBER IN C, PARAMETERS AS REQ'D IN DE
;        6-7:              LHLD & FOR FIRST ADDRESS WHICH CANNOT
;                          BE USED BY PROGRAM
;      5C-7D:              DEFAULT FCB
;      80-FF:              DEFAULT BUFFER, ALSO COMMAND LINE
;        100:              FIRST ADDR AVAILABLE FOR USER PROGRAM
;
;        +++++ LOGICAL EQUATES +++++
;
```

|        |           |              |                                 |
|--------|-----------|--------------|---------------------------------|
| 0000   | FALSE     | = 0          |                                 |
| FFFF   | TRUE      | = #FALSE     |                                 |
| 000D   | CR        | = 0DH        | ;CARRIAGE RETURN                |
| 000A   | LF        | = 0AH        | ;LINE FEED                      |
| 0008   | BS        | = 08         | ;BACK SPACE                     |
| 0000   | NULL      | = 0          | ;NULL CHARACTER                 |
| 007F   | RUBOUT    | = 07FH       | ;RUBOUT CHARACTER               |
| 0020   | SPACE     = ' '          | ;SPACE CHARACTER                |
| 001B   | ESC       | = 27         | ;ESCAPE CHARACTER               |
| 0002   | STX       | = 2          | ;START OF TEXT CHARACTER        |
| 0003   | ETX       | = 3          | ;END OF TEXT CHARACTER          |
| 001F   | US        | = 1FH        | ;UNIT SEPARATOR CHARACTER       |
|        |           |              |                                 |
| FFFF   | HIREVS    | = TRUE       | ;TRUE FOR 30 RPM, FALSE FOR 24  |
| 0000   | LOREVS    | = #HIREVS    |                                 |
|        |           |              |                                 |
| FFFF   | IMSAI     | = TRUE       | ;TRUE FOR IMSAI, FALSE FOR NYLAC|
| 0000   | NYLAC     | = #IMSAI     |                                 |
|        |           |              |                                 |
| FFFF   | DEMO      | = TRUE       | ;TRUE DISABLES ERROR CODES      |
|        |           |              | ;AND RETRIES BAD SECTORS        |
|        |           |              |                                 |
| FFFF   | CENABLE   | = TRUE       | ;TRUE ENABLES 'CHEAT' ROUTINE   |
|        |           |              |                                 |
| F000   | VIO       | = 0F000H     | ;IMSAI VIO VIDEO DISPLAY LOCATION|
| F080   | NVLCRT    | = 0F080H     | ;NYLAC VIDEO LOCATION           |
| 7300   | STACK     | = MAPEND +200H | ;1/2 K STACK AREA             |
|        |           |              |                                 |
| F000   | SCRN      | = (IMSAI & VIO) ! (NYLAC & NVLCRT) |           |
|        |           |              |                                 |
| 001E   | DLENGTH   | = 30         | ;30 BYTES PER DATA TRACK        |
| 00D4   | SCANS     | = 212        | ;THIS MANY PIXELS *8 PER TRACK  |
| 013D   | TRACKS    | = 317        | ;NO. OF TRACKS ON DISK          |
| 8000   | MAPLEN    | = 8000H      | ;LENGTH OF DIRECTORY INPUT MAP  |
|        |           |              |                                 |
| 0021   | STATUS    | = 21H        | ;HARDWARE STATUS PORT (INPUT)   |
| 0020   | DATA      | = 20H        | ;DATA READ PORT (INPUT)         |
| 0023   | SETUP     | = 23H        | ;SOFTWARE CONFIGURING PORT (OUTPUT)|
| 0022   | CONTROL   | = 22H        | ;HARDWARE CONTROLLING PORT (OUTPUT)|
| 0092   | CONFIG    | = 092H       | ;SETUP WORD FOR 8255            |

```
;
; DATA FORMAT FOR READ DATA:
;       DATA SHALL CONSIST OF :
;               1. 8 BIT FLAG (0FFH) BEGINNING
;               2. 30 BYTES DATA, ODD PARITY, MSB FIRST
;               3. 8 BIT FLAG (0FFH) ENDING
```

```
;****************************************
;*                                      *
;*          MACRO DEFINES               *
;*                                      *
;****************************************
;
;
.DEFINE FLIP [REG1,REG2] = [
;
        MOV A,REG1
        CMA
        MOV REG1,A
;
.IFDEF REG2,[
;
        MOV A,REG2
        CMA
        MOV REG2,A
]
]
.DEFINE MOVE [DEST,SOURCE,LENGTH] = [
        LXI H,SOURCE
        LXI D,DEST
        LXI B,LENGTH
        LDIR
]
.DEFINE CLEAR [LOCATION,LENGTH,FILLER] = [
        LXI H,LOCATION
        LXI D,LOCATION+1
        LXI B,LENGTH-1
.IFDEF FILLER,[
        MVI M,FILLER
]
.IFNDEF FILLER,[
        MVI M,0
]
        LDIR
]
;
;
;****************************************
;*    PROGRAM STARTS HERE               *
;****************************************
;
;
;
```

| | | | | |
|---|---|---|---|---|
| 0000' | C3 0200 | START: | JMP BEGIN | ;CP/M CONVENTION |
| | | ; | | |
| 0200 | | .LOC 200H | | ;TO NEXT PAGE |
| | | ; | | |
| 0200 | 31 7300 | BEGIN: | LXI SP,STACK | ;SET STACK POINTER |
| 0203 | DD21 0386 | | LXI X,TESTIT | ;ADDRESS FOR DECODE ROUTINE |
| 0207 | 2A 0001 | | LHLD 1 | ;GET BIOS JUMP TABLE ADDRESS |
| 020A | 11 0003 | | LXI D,3 | ;OFFSET TO DE |
| 020D | 19 | | DAD D | ;GET KSTAT VECTOR |
| 020E | 22 0220 | | SHLD KSTAT+1 | |
| 0211 | 19 | | DAD D | ;KDATA VECTOR |
| 0212 | 22 0223 | | SHLD KDATA+1 | |
| 0215 | 19 | | DAD D | ;KOUT VECTOR |
| 0216 | 22 0242 | | SHLD KVEC+1 | |
| 0219 | 19 | | DAD D | ;LISTER VECTOR |
| 021A | 22 0248 | | SHLD LISTER+1 | |
| 021D | 18 2F | | JMPR BEGIN1 | ;AROUND TABLE |
| | | ; | | |
| 021F | C3 0000 | KSTAT: | JMP 0 | |
| 0222 | C3 0000 | KDATA: | JMP 0 | |
| 0225 | C5 | KOUT: | PUSH B | |
| 0226 | E5 | | PUSH H | |

```
0227   CB B9                     RES  7,C
0229   79                        MOV  A,C             ;RECOVER BYTE TO TEST
022A   FE0D                      CPI  CR              ;CARRIAGE RETURN?
022C   2813                      JRZ  KVEC            ;JUMP IF OK
022E   FE0A                      CPI  LF              ;LINE FEED?
0230   280F                      JRZ  KVEC            ;JUMP IF SO
0232   FE08                      CPI  BS              ;BACK SPACE?
0234   280B                      JRZ  KVEC            ;JUMP IF SO
0236   FE20                      CPI  SPACE           ;TOO SMALL?
0238   D2 023D                   JNC  KFINE           ;JUMP IF NOT
023B   0E5C            KSHIT:    MVI  C,'\'           ;SHOW GARBAGE AS BACKSLASH
023D   FE7F            KFINE:    CPI  07FH            ;RUBOUT?
023F   28FA                      JRZ  KSHIT           ;KILL THESE
0241   CD 0000         KVEC:     CALL 0
0244   E1                        POP  H
0245   C1                        POP  B
0246   C9                        RET
0247   C3 0000         LISTER:   JMP  0
                      ;
024A   0618            BEGIN1:   MVI  B,24            ;THIS MANY LINES
                      .IFN IMSAI, [
024C   3A 0003                   LDA  3               ;GET I/O BYTE
024F   E603                      ANI  3               ;MASK FOR CONSOLE INFO
0251   FE01                      CPI  1               ;CON:=TTY: ?
0253   2809                      JRZ  NOSPACE         ;NO SPACES IF TTY:
0255   FE02                      CPI  2               ;CON:=PHONE?
0257   2805                      JRZ  NOSPACE         ;NO SPACES TO PHONE EITHER
                      ]
0259   CD 064C         ..LOOP:   CALL CRLF            ;SPACE UP TO CLEAR SCREEN
025C   10FB                      DJNZ ..LOOP
025E   3E92            NOSPACE:  MVI  A,CONFIG        ;SET UP CONTROLLER BOARD
0260   D323                      OUT  SETUP
0262   21 0E49                   CLEAR NAMEBUF,MAPEND-NAMEBUF ;CLEAR ALL MEMOR
                      ;
026F   11 0A72         RESTART:  LXI  D,HELLO         ;SAY HELLO TO THE FOLKS
                      .IFN IMSAI, [
0272   3A 0003                   LDA  3               ;GET I/O BYTE
0275   E603                      ANI  3               ;MASK FOR CON:
0277   FE01                      CPI  1               ;TTY?
0279   2804                      JRZ  ..MSG1          ;JUMP IF SO
027B   FE02                      CPI  2               ;PHONE?
027D   2003                      JRNZ ..MSG2          ;JUMP IF NOT
027F   11 0BAB         ..MSG1:   LXI  D,HELLO1        ;PUT IN NEW MESSAGE
0282                   ..MSG2:
                      ]
0282   0EC9                      MVI  C,PRINT
0284   CD 0005                   CALL BDOS
0287   CD 064C         CRLOOP:   CALL CRLF
                      ;
                      ; CCP
                      ;
                      ; CONSOLE COMMAND PROCESSOR.
                      ; THIS ROUTINE TAKES THE USERS KEYPRESS & DOES THE
                      ; APPROPRIATE THING. VALID COMMANDS ARE:
                      ;
                      ;     I - BUILDS & PRINTS INDEX OF NEW DISK
                      ;
                      ;     Q - QUIT BACK TO CP/M
                      ;
                      ;     P - PRINT PARITY ERRORS
                      ;
                      ;     A(XX) - RETRIEVE DATA (THE LETTER 'A' FOLLOWED
                      ;                            BY 2 CHARACTERS)
                      ;
                      ; INVALID ENTRYS WILL CAUSE AN ERROR MESSAGE TO BE
                      ; PRINTED AND THE COMMANDS TO BE DISPLAYED ON THE CRT.
                      ;
                      ;
```

```
028A    11 0CD8      CCP:    LXI  D,PROMPT      ;PRINT 'COMMAND >'
028D    0E09                 MVI  C,PRINT
028F    CD 0005              CALL BDOS
0292    11 1416              LXI  D,COMAND      ;POINT TO INPUT LINE BUFFER
0295    3E10                 MVI  A,16          ;MAKE IT 16 LONG
0297    12                   STAX D
0298    0E0A                 MVI  C,INLINE      ;GET LINE FROM CONSOLE
029A    CD 0005              CALL BDOS
029D    CD 064C              CALL CRLF          ;SPACE UP LINE AFTER COMMAND
02A0    3A 1418              LDA  COMAND+2      ;GET FIRST CHAR. RETURNED
02A3    FE49                 CPI  'I'           ;INDEX REQUEST?
02A5    CA 0749              JZ   INDEX         ;JUMP IF SO
02A8    FE51                 CPI  'Q'           ;ALL DONE?
02AA    CA 0000              JZ   0             ;REBOOT IF SO
02AD    3A 1415              LDA  INITFLG       ;IF NOT, CHECK FOR INIT
02B0    B7                   ORA  A             ;INDEXED YET?
02B1    200A                 JRNZ CCP1          ;JUMP IF OK
02B3    11 0A29              LXI  D,NOINDEX     ;ANNOUNCE INDEX ERROR
02B6    0E09                 MVI  C,PRINT
02B8    CD 0005              CALL BDOS
02BB    18CD                 JMPR CCP           ;& TRY AGAIN
02BD    3A 1418      CCP1:   LDA  COMAND+2      ;RESTORE CHARACTER
02C0    FE41                 CPI  'A'           ;REQUEST FOR DATA?
02C2    CA 0926              JZ   GETDATA       ;JUMP IF SO
                    .IFDEF PARPRNT, [
                             CPI  'P'           ;REQUEST FOR ERROR DUMP?
                             JZ   PARPRNT       ;DUMP ERROR TABLE IF SO
                    ]
                    .IFN DEMO, [
02C5    FE53                 CPI  'S'           ;SWITCH CONSOLE?
02C7    CA 0922              JZ   CONSWAP       ;JUMP IF SO
                    ]
02CA    11 0CE4              LXI  D,INVALID     ;FLAG ERROR TO USER IF
02CD    0E09                 MVI  C,PRINT       ;NONE OF ABOVE COMMANDS
02CF    CD 0005              CALL BDOS
02D2    18B6                 JMPR CCP
                    ;
                    ;
                    ;
                    ;
                    ;****************************************
                    ;*                                      *
                    ;*        CALLED SUBROUTINES            *
                    ;*                                      *
                    ;****************************************
                    ;
                    ;
                    ;   READ4, READ16 & READ88
                    ;
                    ;   THIS SUBROUTINE READS SEQUENTIAL SCANS FROM THE
                    ;   DISK & MAPS THEM INTO AN INPUT HOLDING BUFFER.
                    ;   IT THEN DECODES THE VALID SCANS TO THE OUTPUT BUFFER
                    ;   'DBUF' WHILE RECORDING THE NUMBER OF VALID SCANS IN
                    ;   STORAGE LOCATION 'BUFNO'.
                    ;
                    ;   THIS ROUTINE USES ALL REGISTERS (A,B,C,D,E,H,L)
                    ;
02D4    11 58D4      READ88: LXI  D,88<8!SCANS  ;NO. OF SCANS IN 1 TRACK TO E
                                                ; D = 88 SCANS
02D7    C3 02E3              JMP  READ1
02DA    11 04D4      READ4:  LXI  D,4<8!SCANS   ;NO. OF SCANS IN 1 TRACK TO E
                                                ;D = 4 PASSES
02DD    C3 02E3              JMP  READ1
02E0    11 10D4      READ16: LXI  D,16<8!SCANS  ;NO. OF SCANS IN 1 TRACK TO E
                                                ;D = 16 PASSES
                    ;
02E3    7A           READ1:  MOV  A,D           ;GET NUMBER OF SCANS
02E4    32 1400              STA  DPOINT        ;STORE IN MEMORY
02E7    21 1900              LXI  H,INBUF       ;BUFFER BASE ADDRESS
```

```
02EA   43              MOV B,E           ;NO. OF SCANS TO B
02EB   0E20            MVI C,DATA        ;C=DATA PORT FOR INPUT
02ED   3E01            MVI A,1           ;BIT FOR BUS REQUEST DISABLE
02EF   F3              DI                ;NO TIME FOR INTERRUPTS
02F0   D322            OUT CONTROL       ;OR BUS REQUESTS
                ;
02F2   DB21    RDHANG: IN STATUS         ;WATCH FOR START OF NEW SCAN
02F4   1F              RAR               ;LSB IS STATUS BIT
02F5   30FB            JRNC RDHANG       ;WAIT UNTIL READY
02F7   AF              XRA A             ;PUT IN ZERO FOR LATER
                ;
02F8   EDB2    RDLOOP: INIR              ;BLOCK TRANSFER FROM PORT MAPS
                                         ;DATA TO MEMORY .
                                         ;IT IS SYNC'ED TO THE I/O USING
                                         ;WAIT STATES

02FA   43              MOV B,E           ;RESTORE BYTE COUNT
02FB   24              INR H             ;TO NEXT PAGE
02FC   6F              MOV L,A           ;RESET LO BYTE
02FD   15              DCR D             ;COUNT PASS #
02FE   C2 02F2         JNZ RDHANG        ;LOOP IF NOT DONE

0301   FB              EI                ;INTERRUPTS OK NOW
0302   D322            OUT CONTROL       ;AND BUS REQUESTS
                ;
0304   32 1401         STA BUFNO         ;RESET BUFFER COUNTER
                ;
                ;
0307   21 1900         LXI H,INBUF       ;PIXELS ARE HERE
030A   22 140F         SHLD PIXLOC       ;THIS IS SOURCE POINTER
030D   22 1411         SHLD BITBUF       ;AND DESTINATION
0310   1810            JMPR PSTART       ;JUMP AROUND LOOP CODE
0312   2A 140F PIXLOOP:LHLD PIXLOC       ;GET SOURCE ADDRESS
0315   24              INR H             ;PLUS 1 PAGE
0316   3A 1400         LDA DPOINT        ;RECOVER NUMBER OF SCANS
0319   C619            ADI INBUF>8       ;ADD BASE ADDRESS OF BUFFER
031B   BC              CMP H             ;ARE WE DONE?
031C   CA 0471         JZ DECODE         ;JUMP IF SO
031F   22 140F         SHLD PIXLOC       ;UPDATE NEW POINTER TO MEMORY
0322           PSTART:
                ;
                ;  THIS ROUTINE ADDS 3 BITS TO THE FLAG BLOCK
                ;
                .IFN CENABLE,  [
0322   0610            MVI B,16          ;SET LIMIT
0324   2C      CHEAT:  INR L             ;TO NEXT ONE
0325   7E              MOV A,M           ;GET BYTE
0326   B7              ORA A             ;SET FLAGS
0327   2005            JRNZ CHEAT9       ;JUMP IF ONES FOUND
0329   10F9            DJNZ CHEAT        ;LOOP TILL TIMEOUT
032B   C3 0312         JMP PIXLOOP       ;GET NEW SCAN IF NO FLAG
032E   3C      CHEAT9: INR A             ;CHECK FOR FF
032F   2005            JRNZ CHEAT1
0331   2B              DCX H
0332   3607            MVI M,7
0334   1842            JMPR FLAG
0336   3D      CHEAT1: DCR A
0337   FE01            CPI 1
0339   2004            JRNZ CHEAT2
033B   360F            MVI M,0FH
033D   1839            JMPR FLAG
033F   FE03    CHEAT2: CPI 3
0341   2004            JRNZ CHEAT3
0343   361F            MVI M,1FH
0345   1831            JMPR FLAG
0347   FE07    CHEAT3: CPI 7
0349   2004            JRNZ CHEAT4
034B   363F            MVI M,3FH
034D   1829            JMPR FLAG
```

```
034F   FE0F         CHEAT4:  CPI 0FH
0351   2004                  JRNZ CHEAT5
0353   367F                  MVI M,07FH
0355   1821                  JMPR FLAG
0357   FE1F         CHEAT5:  CPI 1FH
0359   2004                  JRNZ CHEAT6
035B   36FF                  MVI M,0FFH
035D   1819                  JMPR FLAG
035F   FE3F         CHEAT6:  CPI 3FH
0361   2007                  JRNZ CHEAT7
0363   36FF                  MVI M,0FFH
0365   2B                    DCX H
0366   3601                  MVI M,1
0368   180E                  JMPR FLAG
036A   FE7F         CHEAT7:  CPI 7FH
036C   2805                  JRZ CHEAT8
036E   10B4                  DJNZ CHEAT
0370   C3 0312               JMP PIXLOOP     ;GET NEXT SCAN IF GARBAGE
0373   36FF         CHEAT8:  MVI M,0FFH
0375   2B                    DCX H
0376   3603                  MVI M,03
0378                FLAG:
                    ]
                    ;
0378   2A 1411              LHLD BITBUF      ;FINAL DESTINATION BUFFER
037B   0608                 MVI B,8          ;8 BITS/BYTE
037D   D9                   EXX              ;THESE ARE NOW ALTS
037E   2A 140F              LHLD PIXLOC      ;POINT TO PIXELS
0381   0601                 MVI B,1          ;WE NEED NEW BYTE
0383   CD 040D              CALL NEXT6       ;GET NEW BYTE & START
                    ;
0386   17           TESTIT:  ORA A            ;PERFECT ZERO?
0387   283A                  JRZ GOOD0       ;JUMP IF SO
0389   FE3F                  CPI 111111B     ;PERFECT 1?
038B   283E                  JRZ GOOD1       ;JUMP IF SO
038D   FE0F                  CPI 001111B     ;RIGHT SHIFTED ONE?
038F   2856                  JRZ SR11        ;SHIFT RIGHT 1 & PUT 1
0391   FE1F                  CPI 011111B     ;RIGHT SHIFTED ONE?
0393   2836                  JRZ GOOD1       ;PUT 1 IF SO
0395   FE3E                  CPI 111110B     ;LEFT SHIFTED ONE?
0397   2859                  JRZ SL11        ;SHIFT LEFT 1 & PUT 1
0399   FE3C                  CPI 111100B     ;DOUBLE LEFT SHIFTED 1?
039B   2855                  JRZ SL11        ;SHIFT LEFT 1 & PUT 1
039D   FE01                  CPI 000001B     ;LEFT SHIFTED ZERO?
039F   2832                  JRZ SL10        ;SHIFT LEFT 1 & PUT 0
03A1   FE03                  CPI 000011B     ;DOUBLE LEFT SHIFTED 0?
03A3   2828                  JRZ SL20        ;SHIFT LEFT 2 & PUT 0
03A5   FE30                  CPI 110000B     ;RIGHT SHIFTED ZERO?
03A7   2852                  JRZ SR10        ;SHIFT RIGHT 1 & PUT 0
03A9   FE20                  CPI 100000B     ;RIGHT SHIFTED 0?
03AB   2816                  JRZ GOOD0       ;PU 0 IF SO
03AD   FE1E                  CPI 011110B     ;PERFECT ONE?
03AF   281A                  JRZ GOOD1       ;JUMP IF SO
03B1   FE21                  CPI 100001B     ;PERFECT 0?
03B3   280E                  JRZ GOOD0       ;JUMP IF SO
03B5   FE38                  CPI 111000B     ;TRIPLE LEFT SHIFTED 1?
03B7   2839                  JRZ SL11        ;SHIFT LEFT 1 & PUT 1
03B9   FE0E                  CPI 001110B     ;RIGHT SHIFTED ONE?
03BB   282A                  JRZ SR11        ;SHIFT RIGHT 1 & PUT 1
03BD   FE1C                  CPI 011100B     ;LEFT SHIFTED ONE?
03BF   2831                  JRZ SL11        ;SHIFT LEFT 1 & PUT 1
03C1   1843                  JMPR GARBAGE    ;JUMP IF TRASH
                    ;
03C3   CD 0457      GOOD0:   CALL PUTZERO    ;CALL IT A 0
03C6   CD 040D               CALL NEXT6      ;GET NEW BYTE
03C9   DDE9                  PCIX            ; & TEST IT
03CB   CD 045B      GOOD1:   CALL PUTONE     ;CALL IT ONE
03CE   CD 040D               CALL NEXT6      ;NEW BYTE
```

```
03D1   DDE9                    PCIX              ;& DECODE
03D3   CD 0457     SL10:       CALL PUTZERO      ;CALL IT ZERO
03D6   3E01                    MVI A,1           ;PUT IN LEADING PIXEL
03D8   CD 041A                 CALL NEXT5        ;GET REST
03DB   DDE9                    PCIX              ;& DECODE
03DD   CD 0457     SL20:       CALL PUTZERO      ;CALL IT ZERO
03E0   3E03                    MVI A,3           ;PUT IN 2 LEADING PIXELS
03E2   CD 0426                 CALL NEXT4        ;GET REST
03E5   DDE9                    PCIX              ;& DECODE
03E7   CD 045B     SR11:       CALL PUTONE       ;CALL IT A ONE
03EA   CD 044A                 CALL NEXT1        ;THROW AWAY ONE
03ED   CD 040D                 CALL NEXT6        ;GET NEW BYTE
03F0   DDE9                    PCIX              ;&DECODE
03F2   CD 045B     SL11:       CALL PUTONE       ;CALL IT ONE
03F5   AF                      XRA A             ;GET LEADING ZERO
03F6   CD 041A                 CALL NEXT5        ;PLUS NEXT 5
03F9   DDE9                    PCIX              ;& DECODE
03FB   CD 0457     SR10:       CALL PUTZERO      ;CALL IT A ZERO
03FE   CD 044A                 CALL NEXT1        ;THROW AWAY 1
0401   CD 040D                 CALL NEXT6        ;GET NEW BYTE
0404   DDE9                    PCIX              ;& DECODE
                               ;
0406   E61F        GARBAGE:    ANI 1FH           ;DROP HI BIT
0408   CD 044A                 CALL NEXT1        ;GET NEXT 1
040B   DDE9                    PCIX              ;TRY AGAIN
                               ;
                               ;
                               ;
                               ; THIS ROUTINE PUTS THE NEXT 1 TO 6 PIXELS IN
                               ; THE ACCUMULATOR FROM INBUF.
                               ;
040D   AF          NEXT6:      XRA A             ;START WITH 0
040E   1006                    DJNZ CONT4        ;JUMP IF OK
0410   4E                      MOV C,M
0411   2C                      INR L
0412   2852                    JRZ NXTDONE
0414   0608                    MVI B,8
0416   CB01        CONT4:      RLCR C
0418   CB17                    RALR A
041A   1006        NEXT5:      DJNZ CONT5
041C   4E                      MOV C,M
041D   2C                      INR L
041E   2846                    JRZ NXTDONE
0420   0608                    MVI B,8
0422   CB01        CONT5:      RLCR C
0424   CB17                    RALR A
0426   1006        NEXT4:      DJNZ CONT6
0428   4E                      MOV C,M
0429   2C                      INR L
042A   283A                    JRZ NXTDONE
042C   0608                    MVI B,8
042E   CB01        CONT6:      RLCR C
0430   CB17                    RALR A
0432   1006        NEXT3:      DJNZ CONT1        ;JUMP IF BYTE STILL OK
0434   4E                      MOV C,M           ;GET NEW BYTE
0435   2C                      INR L             ;POINT TO NEXT
0436   282E                    JRZ NXTDONE       ;JUMP IF WE'RE FINISHED
0438   0608                    MVI B,8           ;RESET BIT COUNTER
043A   CB01        CONT1:      RLCR C            ;HI BIT OF C TO CARRY
043C   CB17                    RALR A            ;CARRY TO LO BIT OF A
043E   1006        NEXT2:      DJNZ CONT2
0440   4E                      MOV C,M
0441   2C                      INR L
0442   2822                    JRZ NXTDONE
0444   0608                    MVI B,8
0446   CB01        CONT2:      RLCR C
0448   CB17                    RALR A
044A   1006        NEXT1:      DJNZ CONT3
044C   4E                      MOV C,M
```

```
044D    2C              INR L
044E    2816            JRZ NXTDONE
0450    0608            MVI B,8
0452    CB01    CONT3:  RLCR C
0454    CB17            RALR A
0456    C9              RET
                ;
0457    AF      PUTZERO:XRA A           ;RESET CARRY
0458    C3 045C         JMP PUTIN       ;AND GO
                ;
045B    37      PUTONE: STC             ;SET CARRY
045C    D9      PUTIN:  EXX             ;RECOVER ALTS
045D    CB16            RALR M          ;SHIFT CARRY TO MEMORY
045F    1003            DJNZ PUTA       ;JUMP IF BYTE STILL O
0461    23              INX H           ;POINT TO NEXT
0462    0608            MVI B,8         ;RESET BIT COUNTER
0464    D9      PUTA:   EXX             ;BACK TO ORIGS
0465    C9              RET
                ;
0466    E1      NXTDONE:POP H           ;FIX STACK FROM CALL
                ;
0467    2A 1411         LHLD BITBUF     ;GET DESTINATION POINTER
046A    24              INR H           ;BUMP HI PAGE
046B    22 1411         SHLD BITBUF     ;UPDATE TO MEMORY
046E    C3 0312         JMP PIXLOOP     ;DO NEXT ONE
                ;
                ; DECODE MAPS THE VALID SCANS TO THE OUTPUT BUFFER
                ;
0471    3E18    DECODE: MVI A,(INBUF)8)-1 ;BASE ADDRESS LESS 1
0473    32 140E         STA BYTENO      ;STORE IN MEMORY
0476    AF              XRA A           ;GET ZERO
0477    32 1401         STA BUFNO       ;RESET BUFFER COUNTER
                ;
047A    3A 140E NEXTPASS:LDA BYTENO     ;GET CURRENT BYTE
047D    57              MOV D,A         ;TO D REGISTER
047E    14              INR D           ;NEXT BUFFER #
047F    3A 1400         LDA DPOINT      ;RECOVER NUMBER OF SCANS
0482    C619            ADI INBUF)8     ;ADD BASE ADDRESS OF BUFFER
0484    BA              CMP D           ;ARE WE DONE?
0485    C8              RZ              ;RETURN IF SO
0486    7A              MOV A,D         ;RETURN NEW VALUE TO MEMORY
0487    32 140E         STA BYTENO
048A    1E00            MVI E,0         ;CLEAR LOW BYTE OF POINTER
                ;
048C    1A      BOTFIND:LDAX D          ;GET BYTE
048D    B7              ORA A           ;ALL ZEROS?
048E    2008            JRNZ BOT1       ;JUMP IF ONES FOUND
0490    CB53            BIT 2,E         ;ARE WE TO 5TH BYTE YET?
0492    20E6            JRNZ NEXTPASS   ;JUMP IF SO
0494    1C              INR E           ;NEXT BYTE
0495    C3 048C         JMP BOTFIND     ;LOOP TILL DONE
                ;
0498    67      BOT1:   MOV H,A         ;1ST BYTE TO H
0499    1C              INR E           ;POINT TO NEXT
049A    1A              LDAX D          ;GET IT
049B    6F              MOV L,A         ;TO L REGISTER
049C    0600            MVI B,0         ;SHIFT COUNT (B)=ZERO
                ;
049E    7C      BOTLOOP:MOV A,H         ;GET BYTE TO TEST
049F    3C              INR A           ;TEST FOR FF
04A0    2810            JRZ BOTFOUND    ;JUMP IF FLAG FOUND
04A2    CB5B            BIT 3,B         ;SHIFT 8 YET?
04A4    2005            JRNZ BOT9       ;TRY NEXT BYTE IF SO
04A6    04              INR B           ;COUNT SHIFT
04A7    29              DAD H           ;16 BIT LEFT SHIFT
04A8    C3 049E         JMP BOTLOOP     ;AND TEST AGAIN
04AB    CB53    BOT9:   BIT 2,E         ;ARE WE DONE YET?
04AD    20CB            JRNZ NEXTPASS   ;JUMP IF SO
```

```
04AF    C3 048C              JMP BOTFIND
                        ;
                        ; WE NOW HAVE A VALID B.O.T. FLAG
                        ; ADDRESS TO RECOVER 1ST VALID DATA BYTE IS IN (DE)
                        ; SHIFT COUNT IS IN B
                        ;
04B2                    BOTFOUND:
04B2    21 001E              LXI H,DLENGTH       ;POINT TO EOT FLAG
04B5    48                   MOV C,B             ;SAVE SHIFT COUNT IN C
04B6    19                   DAD D               ;FLAG BYTE NOW AT (HL)
04B7    7E                   MOV A,M             ;GET BYTE
04B8    2C                   INR L               ;POINT TO NEXT
04B9    6E                   MOV L,M             ;TO L REGISTER
04BA    67                   MOV H,A             ;RESTORE 1ST TO H
04BB    AF                   XRA A               ;GET 0
04BC    B0                   ORA B               ;0 SHIFT?
04BD    2803                 JRZ BOT3            ;JUMP IF SO
04BF    29          BOT2:    DAD H               ;SHIFT LEFT
04C0    10FD                 DJNZ BOT2           ;DO TILL SHIFT COUNT=0
04C2    24          BOT3:    INR H               ;CHECK FOR FF
04C3    C2 047A              JNZ NEXTPASS        ;JUMP IF NO VALID EOT FLAG
                        ;
                        ;
                        ; WE NOW KNOW WE HAVE A VALID SCAN
                        ; SHIFT COUNT IS IN C REG.
                        ; (DE) POINTS TO SOURCE BUFFER, FIRST VALID BYTE
                        ;
                        ;
04C6    AF          GOODONE:XRA A                ;GET 0
04C7    B1                   ORA C               ;0 SHIFT?
04C8    2020                 JRNZ SHIFT0         ;JUMP IF NOT
04CA    EB                   XCHG                ;POINTER TO HL
04CB    11 1500              LXI D,DBUF          ;POINT TO DESTINATION BUFFER
04CE    E5                   PUSH H              ;SAVE POINTER IN STACK
04CF    61                   MOV H,C             ;CLEAR HI BYTE OF PAIR
04D0    3A 1401              LDA BUFNO           ;GET CURRENT BUFFER
04D3    6F                   MOV L,A             ;USE AS LO BYTE OF PAIR
04D4    0605                 MVI B,5             ;SET UP FOR *32
04D6    29          SHIFT3:  DAD H               ;TIMES TWO
04D7    10FD                 DJNZ SHIFT3         ;TILL DONE
04D9    3C                   INR A               ;UPDATE TO MEMORY
04DA    32 1401              STA BUFNO
04DD    19                   DAD D               ;BUFFER ADDRESS TO HL
04DE    EB                   XCHG                ;TO DE
04DF    E1                   POP H               ;RESTORE HL
04E0    01 001E              LXI B,DLENGTH       ;DATA LENGTH TO BC
04E3    EDB0                 LDIR                ;MOVE IT
04E5    CD 0519              CALL SCHECK         ;CHECK VALIDITY OF DATA
04E8    18B0                 JMPR NEXTPASS       ;DO NEXT ONE
                        ;
                        ;
04EA                    SHIFT0:
04EA    EB                   XCHG                ;SOURCE POINTER TO HL
04EB    E5                   PUSH H              ;SAVE POINTER IN STACK
04EC    3A 1401              LDA BUFNO           ;GET CURRENT BUFFER POINTER
04EF    2600                 MVI H,0             ;CLEAR HI BYTE OF PAIR
04F1    6F                   MOV L,A             ;USE BUFFER AS LO BYTE
04F2    0605                 MVI B,5             ;SHIFT LEFT 5 (*32)
04F4    29          SHIFT2:  DAD H               ;LEFT SHIFT (*2)
04F5    10FD                 DJNZ SHIFT2         ;TILL DONE
04F7    3C                   INR A               ;UPDATE BUFFER COUNTER
04F8    32 1401              STA BUFNO
04FB    11 1500              LXI D,DBUF          ;BASE ADDR.
04FE    19                   DAD D               ;+ OFFSET TO HL
04FF    3E1E                 MVI A,DLENGTH       ;# OF BYTES TO A
                        ;
0501    E3          SHIFT1:  XTHL                ;GET SOURCE POINTER
0502    56                   MOV D,M             ;1ST BYTE TO MSD
```

```
0503   2C              INR L           ;POINT TO NEXT
0504   5E              MOV E,M         ;2ND TO LSD
0505   E3              XTHL            ;GET DESTINATION POINTER
0506   EB              XCHG            ;TO DE, SHIFT WORD TO HL
0507   41              MOV B,C         ;SET UP SHIFT TO B
0508   29      SHIFT:  DAD H           ;16 BIT LEFT SHIFT
0509   10FD            DJNZ SHIFT      ;UNTIL DONE
050B   EB              XCHG            ;DEST POINTER TO HL
050C   72              MOV M,D         ;SHIFTED WORD TO MEMORY
050D   2C              INR L           ;POINT TO NEXT
050E   3D              DCR A           ;COUNT PASS NO.
050F   C2 0501         JNZ SHIFT1      ;TILL DONE
0512   CD 0519         CALL SCHECK     ;CHECK VALIDITY OF DATA
0515   E1              POP H           ;FIX STACK
0516   C3 047A         JMP NEXTPASS
;
;
; SCHECK CHECKS THE VALIDITY OF DATA AT (DBUF)
;
0519   E5      SCHECK: PUSH H          ;PRESERVE REGISTERS
051A   D5              PUSH D
051B   C5              PUSH B
051C   11 1502         LXI D,DBUF+2    ;POINT TO BUFFER
051F   3A 1401         LDA BUFNO       ;GET PASS NUMBER
0522   3D              DCR A           ;CHECK FOR 1ST LINE
0523   2821            JRZ GOHOME      ;SKIP ROUTINE IF FIRST
0525   3D              DCR A           ;POINT TO OLD BUFFER
0526   2600            MVI H,0         ;RESET HI BYTE OF PTR
0528   6F              MOV L,A         ;BUFFER NO. TO LO BYTE
0529   0605            MVI B,5         ;SET UP FOR *32
052B   29      ..LOOP: DAD H           ;16 BIT LEFT SHIFT
052C   10FD            DJNZ ..LOOP     ;TILL DONE
052E   19              DAD D           ;GET NEW LINE LOC.
052F   7E              MOV A,M         ;ADDRESS BYTE
0530   E67F            ANI 7FH         ;DROP HI BIT
0532   FE41            CPI 'A'         ;TOO SMALL?
0534   11 0020         LXI D,20H       ;PUT IN VALUE FOR LATER
0537   382F            JRC BETR1       ;JUMP IF SMALL
0539   FE5B            CPI 'Z'+1       ;TOO LARGE?
053B   302B            JRNC BETR1      ;JUMP IF TOO LARGE
053D   7E              MOV A,M         ;GET BYTE BACK W/PARITY
053E   B7              ORA A           ;CHECK PARITY TOO
053F   EA 0568         JPE BETR1       ;JUMP IF BAD PARITY
0542   19              DAD D           ;POINT TO NEW LINE
0543   BE              CMP M           ;IS IT THE SAME?
0544   2804            JRZ SAME        ;JUMP IF SO
0546   C1      GOHOME: POP B           ;CLEAN UP & RETURN
0547   D1              POP D
0548   E1              POP H
0549   C9              RET
;
054A   AF      SAME:   XRA A           ;CLEAR CARRY
054B   ED52            DSBC D          ;POINT TO OLD LINE
054D   CD 057B         CALL PCHECK     ;CHECK FOR ERRORS
0550   2009            JRNZ SAME1      ;JUMP IF OLD LINE BAD
0552   3A 1401 RESET:  LDA BUFNO       ;GET POINTER
0555   3D              DCR A           ;RESET IT
0556   32 1401         STA BUFNO       ;UPDATE TO MEMORY
0559   18EB            JMPR GOHOME     ;& RETURN
055B   4F      SAME1:  MOV C,A         ;SAVE # OF ERRORS IN C
055C   11 0020         LXI D,20H       ;POINT TO NEW LINE
055F   19              DAD D
0560   CD 057B         CALL PCHECK     ;HOW MANY ERRORS?
0563   B9              CMP C           ;COMPARE WITH OLD LINE
0564   3803            JRC BETTER      ;JUMP IF NEW SCAN BETTER
0566   18EA            JMPR RESET      ;ELSE RESTORE & FINISH
;
0568   19      BETR1:  DAD D           ;HL POINTS TO NEW
```

```
0569   3EE0          BETTER: MVI A,0E0H       ;MASK COUNT BITS
056B   A5                    ANA L
056C   6F                    MOV L,A
056D   E5                    PUSH H            ;SAVE NEW IN STACK
056E   11 FFE0               LXI D,-20H        ;OFFSET TO OLD LINE
0571   19                    DAD D             ;POINT TO OLD LINE
0572   EB                    XCHG              ;TO DE
0573   E1                    POP H             ;RESTORE HL
0574   01 001E               LXI B,DLENGTH     ;THIS MUCH DATA
0577   EDB0                  LDIR              ;MOVE TO REPLACE OLD
0579   18D7                  JMPR RESET        ;& FINISH UP
                      ;
                      ;  PCHECK
                      ;
                      ;  PCHECK CHECKS THE PARITY OF DATA LOCATED AT (HL)
                      ;  IT RETURNS THE NUMBER OF ERRORS TO THE ACC.
                      ;
057B   01 1E00       PCHECK: LXI B,30<8       ;30 BYTES TO B, 0 TO C
057E   3EE0                  MVI A,0E0H        ;MASK OUT COUNT BITS
0580   A5                    ANA L
0581   6F                    MOV L,A
0582   AF            CKLOOP: XRA A             ;GET 0
0583   B6                    ORA M             ;CHECK PARITY OF BYTE
0584   E2 0588               JPO CLOOP1        ;JUMP IF OK PARITY
0587   0C                    INR C             ;COUNT ERRORS
0588   2C            CLOOP1: INR L             ;POINT TO NEXT
0589   10F7                  DJNZ CKLOOP       ;TILL DONE
058B   79                    MOV A,C           ;RECOVER ERROR COUNT
058C   B7                    ORA A             ;SET FLAGS FOR RETURN
058D   C9                    RET
                      ;
                      ;       FINDSEC
                      ;
                      ;  FINDSEC RETURNS A VALID NAMED SCAN.
                      ;  THE SCAN IS NAMED AT LOCATION 'SNAME'
                      ;  DATA IS RETURNED TO 'DBUF' AND IS 30 LONG.
                      ;
058E   CD 0669       FINDSEC:CALL WHATSEC
0591   2804                  JRZ ..FINE        ;JUMP IF FOUND
0593   E1                    POP H             ;RESTORE STACK
0594   C3 0860               JMP COMERR        ;PRINT ERROR & RESTART
0597   3A 1404       ..FINE: LDA SECNO         ;WHICH DO WE WANT?
059A   11 0345       FSEC1:  LXI D,ONELINE     ;DELAY CONSTANT TO D-E
059D   21 0000               LXI H,0           ;CLEAR DESTINATION REGISTER
05A0   0608                  MVI B,8           ;MULTIPLIER IS 8 BIG
05A2   29            MULT:   DAD H             ;SHIFT RESULT LEFT
05A3   17                    RAL               ;SHIFT MULTIPLIER LEFT
05A4   3001                  JRNC NOADD        ;JUMP IF NO ADD
05A6   19                    DAD D             ;ADD MULTIPLICAND TO RESULT
05A7   10F9          NOADD:  DJNZ MULT         ;LOOP TILL DONE
05A9   11 465E               LXI D,(ONELINE*22)-400 ;INDEX DELAY
05AC   19                    DAD D             ;COMBINE WITH OFFSET
05AD   E5                    PUSH H            ;SAVE DELAY
05AE   CD 069E               CALL FINDFLG      ;WAIT FOR FLAG
05B1   E1                    POP H             ;RECOVER DELAY
05B2   2B            WAIT:   DCX H             ;COUNT DELAY
05B3   7C                    MOV A,H           ;CHECK FOR 0
05B4   B5                    ORA L
05B5   20FB                  JRNZ WAIT         ;LOOP TILL TIMEOUT
05B7   CD 02E0               CALL READ16       ;GET SCANS
05BA   3A 1404               LDA SECNO         ;GET DESIRED
05BD   4F                    MOV C,A           ;SAVE IN C REGISTER
05BE   3A 1401               LDA BUFNO         ;GET # OF VALID SCANS
05C1   47                    MOV B,A           ;SAVE IN B REGISTER
05C2   21 1500               LXI H,DBUF        ;SCANS RETURNED HERE
05C5   11 1406       QLOOP:  LXI D,SNAME       ;MOVE NAME TO HERE
05C8   C5                    PUSH B            ;SAVE VALUES
05C9   01 0003               LXI B,3           ;ADDRESS LENGTH
05CC   EDB0                  LDIR              ;MOVE IT
```

```
05CE   E5              PUSH H            ;SAVE POINTER
05CF   CD 0665         CALL WHATSEC      ;WHICH ONE IS IT?
05D2   E1              POP H             ;RESTORE POINTER
05D3   C1              POP B             ;RESTORE VALUES
05D4   2004            JRNZ NOGOOD       ;JUMP IF NOT FOUND
05D6   7B              MOV A,E           ;GET RETURNED VALUE
05D7   B9              CMP C             ;SAME?
05D8   2818            JRZ FOUNDIT       ;JUMP IF SAME
05DA   11 001D NOGOOD: LXI D,29          ;OFFSET TO NEXT LINE
05DD   19              DAD D
05DE   10E5            DJNZ QLOOP        ;TRY NEXT TILL DEFAULT
;
; WE HAVE ERROR... PRINT MESSAGE & VALUES
;
       .IFN #DEMO, [
LOSTIT: MOV L,C                          ;SAVE 1ST VALUE TO PRINT
        MVI C,PRINT
        LXI D,ERROR1
        CALL BDOS
        MVI H,0                          ;CLEAR HI BYTE
        XCHG                             ; TO DE
        CALL PHEX                        ;PRINT AS HEX VALUE
        MVI C,SPACE                      ;PUT SPACE
        CALL KOUT
        XCHG                             ;MULTIPLY BY 3
        MVI H,0
        PUSH H
        DAD H
        XCHG
        POP H
        DAD D
        LXI D,NAMEBUF                    ;POINT TO INDEX BUFFER
        DAD D                            ;ADD BASE + OFFSET
        MVI B,3                          ;3 CHARACTERS
..DUMP: MOV C,M                          ;PRINT THEM
        CALL KOUT
        INX H
        DJNZ ..DUMP
        LXI D,ERROR2
        MVI C,PRINT
        CALL BDOS
        MOVE SNAME,DBUF,3                ;RECOVER 1ST NAME
        CALL WHATSEC                     ;TURN INTO NUMBER
        MVI D,0                          ;CLEAR HI BYTE
        CALL PHEX                        ;PRINT AS HEX
        MVI C,SPACE                      ;PUT OUT SPACE
        CALL KOUT
        LXI H,SNAME                      ;THEN PRINT NAME
        MVI B,3
..SPILL:MOV C,M
        CALL KOUT
        INX H
        DJNZ ..SPILL
        LXI D,ERROR3
        MVI C,PRINT
        CALL BDOS
        LDA BUFNO                        ;NO OF SCANS
        CALL PHEX1
        CALL CRLF
        JMP CCP                          ; RESTART
        ]
;
        .IFN DEMO, [
; THIS ROUTINE RETRIES BAD SEEKS
;
05E0   79              MOV A,C           ;RESTORE DESIRED TO ACC
05E1   32 1404         STA SECNO
05E4   0E0D            MVI C,CONFRM      ;PUT 'FUSE' IN ROUTINE
05E6   CD 0005         CALL BDOS
```

```
05E9   B7              ORA A
05EA   C2 028A         JNZ CCP
05ED   3A 1404         LDA SECNO
05F0   18A8            JMPR FSEC1          ;TRY AGAIN
                ;
                ]
05F2   11 1500  FOUNDIT:LXI D,DBUF         ;DESTINATION
05F5   7D              MOV A,L             ;GET LO BYTE TO COMPARE
05F6   BB              CMP E               ;IS LO BYTE THE SAME?
05F7   2004            JRNZ ..GO           ;JUMP IF NOT
05F9   7C              MOV A,H             ;GET HI BYTE TO COMPARE
05FA   BA              CMP D               ;THIS THE SAME ALSO?
05FB   2805            JRZ FSEC2           ;JUMP IF WE ARE DONE
05FD   01 001E  ..GO:  LXI B,DLENGTH       ;LENGTH OF LINE
0600   EDB0            LDIR                ;MOVE TO DESIRED LOCATION
                ;
                ;
                ; WE NOW HAVE A VALID SCAN AT DBUF
                ; WE WILL NOW CHECK THE PARITY OF THE DATA
                ;
0602   21 1500  FSEC2: LXI H,DBUF          ;BUFFER LOCATION
0605   061E            MVI B,DLENGTH       ;CHECK THIS MANY BYTES
0607   AF       PARITY:XRA A               ;GET 0
0608   B6              ORA M               ;CHECK BYTE
0609   E2 062F         JPO PAROK           ;JUMP IF PARITY IS OK
060C   EB       PARBAD:XCHG                ;SAVE SOURCE POINTER IN DE
060D   2A 1402         LHLD PCOUNT         ;GET CURRENT ERROR COUNTER
0610   73              MOV M,E             ;BYTE # TO MEMORY FIRST
0611   23              INX H
0612   77              MOV M,A             ;THEN BYTE VALUE
0613   23              INX H
0614   3A 1404         LDA SECNO           ;THEN SECTOR WORD
0617   77              MOV M,A
0618   23              INX H
0619   3A 1405         LDA SECNO+1
061C   77              MOV M,A
061D   23              INX H
061E   22 1402         SHLD PCOUNT         ;UPDATE ERROR POINTER
0621   3E14            MVI A,PERROR>8+1    ;ERROR OVERFLOW?
0623   BC              CMP H
0624   2008            JRNZ PAR1           ;JUMP IF OK
                .IFN DEMO, [
0626   21 1300         LXI H,PERROR        ;RESET POINTER FOR DEMO
0629   22 1402         SHLD PCOUNT         ;UPDATE TO MEMORY
062C   1800            JMPR PAR1           ;AND CONTINUE
                ]
                .IFN #DEMO, [
                ;
                PARPRNT:LXI D,ERROR4       ;INFORM USER & KICK OUT
                        MVI C,PRINT
                        CALL BDOS
                        LXI H,PERROR       ;POINT TO BUFFER
                PPRINT: MVI C,SPACE        ;PRINT SPACE
                        PUSH H
                        CALL KOUT
                        POP H
                        MOV A,M            ;GET BYTE LOCATION
                        PUSH H
                        CALL PHEX1         ;PRINT IT
                        MVI B,4            ;PRINT 4 MORE SPACES
                        MVI C,SPACE
                SPACES: CALL KOUT
                        DJNZ SPACES
                        POP H
                        INX H              ;POINT TO BYTE VALUE
                        MOV A,M            ;GET IT
                        PUSH H
                        CALL PHEX1         ;PRINT IT AS HEX
                        MVI B,3            ;3 SPACES THIS TIME
```

```
                            MVI  C,SPACE
                    SPACE2: CALL KOUT
                            DJNZ SPACE2
                            POP  H
                            INX  H           ;POINT TO SECTOR NUMBER
                            MOV  E,M         ;GET FIRST BYTE
                            INX  H           ;THEN SECOND
                            MOV  D,M
                            PUSH H
                            CALL PHEX        ;PRINT AS HEX TO CONSOLE
                            CALL CRLF        ;END OF LINE
                            POP  H
                            MVI  A,3CH       ;PAUSE EVERY 16 LINES
                            ANA  L
                            CZ   KIDATA      ;HANG FOR KEYPRESS
                            MVI  A,PERROR>8+1;TEST FOR DONE
                            CMP  H
                            JNZ  PPRINT      ;LOOP TILL DONE
                            JMP  CCP         ;THEN RESTART
                          ]
                          ;
062E   EB                 PAR1:   XCHG       ;GET SOURCE POINTER BACK
062F   23                 PAPOK:  INX  H     ;UPDATE IT
0630   10D5                       DJNZ PARITY ;CHECK ENTIRE SCAN
0632   C9                         RET
                          ;
                          ;
                          ; FHEX
                          ;
                          ; THIS ROUTINE PRINTS 4-DIGIT HEX FROM D-E
                          ;
                          ;
0633   7A                 PHEX:   MOV  A,D   ;GET HI BYTE
0634   CD 0638                    CALL PHEX1 ;DO HI BYTE FIRST
0637   7B                         MOV  A,E   ;THEN LO BYTE
                          ; FHEX1
                          ;
                          ; FHEX1 PRINTS 2 DIGIT HEX FROM A
                          ;
0638   F5                 PHEX1:  PUSH PSW   ;SAVE FOR NEXT NYBBLE
0639   1F                         RAR        ;SHIFT RIGHT 4
063A   1F                         RAR
063B   1F                         RAR
063C   1F                         RAR
063D   CD 0656                    CALL HEXASC ;TO ASCII
0640   4F                         MOV  C,A    ;TO C REGISTER
0641   CD 0225                    CALL KOUT   ;TO CONSOLE OUT
0644   F1                         POP  PSW    ;LO NYBBLE
0645   CD 0656                    CALL HEXASC ;TO ASCII
0648   4F                         MOV  C,A    ;TO CONSOLE
0649   C3 0225                    JMP  KOUT   ;PRINT & RETURN
                          ;
                          ;
                          ; CRLF
                          ;
                          ; CRLF PRINTS A CARRIAGE RETURN & LINE FEED TO CONSOL
                          ;
064C   0E0D               CRLF:   MVI  C,CR   ;CARRIAGE RETURN FIRST
064E   CD 0225                    CALL KOUT
0651   0E0A                       MVI  C,LF   ;THEN LINE FEED
0653   C3 0225                    JMP  KOUT   ;PRINT & RETURN
                          ;
                          ;
                          ; HEXASC
                          ;
                          ; THIS ROUTINE CONVERTS HEX TO ASCII IN THE A REG
                          ;
                          ;
```

```
0656   E60F           HEXASC: ANI  0FH          ;DROP HI BITS
0658   FE0A                   CPI  10           ;GREATER THAN 9?
065A   3802                   JRC  HASC1        ;JUMP IF NOT
065C   C607                   ADI  7            ;ADD 7 IF LETTER
065E   C630           HASC1:  ADI  30H          ;ASCII BIAS
0660   C9                     RET
                       ;
                       ;
                       ; ASCHEX
                       ;
                       ; THIS ROUTINE CONVERTS ASCII TO HEX IN THE A REG
                       ;
0661   D630           ASCHEX: SUI  30H          ;REMOVE ASCII BIAS
0663   FE0A                   CPI  10           ;DIGIT?
0665   D8                     RC                ;DONE IF SO
0666   D607                   SUI  7            ;LETTER BIAS
0668   C9                     RET
                       ;
                       ;
                       ;
                       ; WHATSEC
                       ;
                       ; WHATSEC DECODES THE NAMED SECTOR AT 'SNAME'
                       ; TO A NUMBERED SECTOR IN THE E REGISTER
                       ; IF THE SECTOR IS NOT FOUND THE ROUTINE RETURNS
                       ; WITH A NON-ZERO IN THE A REG.
                       ;
0669   1E00           WHATSEC:MVI  E,0          ;CLEAR SECTOR COUNTER
066B   21 0E49                LXI  H,NAMEBUF    ;POINT TO LIST OF NAMES
066E   01 1406        WLOOP:  LXI  B,SNAME      ;POINT TO DESIRED STRING
0671   0A                     LDAX B            ;GET FIRST BYTE
0672   BE                     CMP  M            ;MATCH?
0673   2813                   JRZ  MATCH1       ;JUMP IF FIRST MATCH
0675   23                     INX  H            ;TO NEXT IF NOT
0676   23                     INX  H
0677   23             WNEXT:  INX  H
0678   1C                     INR  E            ;COUNT SECTOR
0679   3E1E                   MVI  A,30         ;THIS MANY ENTRIES
067B   BB                     CMP  E            ;ARE WE DONE?
067C   C2 066E                JNZ  WLOOP        ;CONTINUE IF NOT DONE
067F   11 0000        NOSEC:  LXI  D,0          ;WE CAN'T FIND IT,
0682   AF                     XRA  A            ;SO RETURN WITH ERROR
0683   32 1404                STA  SECNO        ;RESET MEMORY POINTER
0686   3D                     DCR  A
0687   C9                     RET
0688   23             MATCH1: INX  H            ;TRY 2ND BYTE
0689   03                     INX  B
068A   0A                     LDAX B            ;GET 2ND BYTE
068B   BE                     CMP  M            ;SAME?
068C   2804                   JRZ  MATCH2       ;JUMP IF GOOD
068E   23                     INX  H            ;TO 3RD BYTE IF NOT
068F   C3 0677                JMP  WNEXT        ;LOOP TILL MATCH
0692   23             MATCH2: INX  H            ;POINT TO 3RD
0693   03                     INX  B
0694   0A                     LDAX B            ;GET LAST ONE
0695   BE                     CMP  M            ;DID WE FIND IT?
0696   20DF                   JRNZ WNEXT        ;JUMP IF NO GOOD
                       ;
                       ; WE FOUND IT!!
                       ;
0698   7B                     MOV  A,E          ;PASS TO MEMORY
0699   32 1404                STA  SECNO
069C   AF                     XRA  A            ;CLEAR FLAGS FOR VALID
069D   C9                     RET               ;DATA INDICATION
                       ;
                       ;
                       ;
```

```
;   FINDFLAG
;
;   FINDFLAG WAITS UNTIL THE SYNC TRACK IS FOUND
;
069E    F3              FINDFLG: DI                 ;NO TIME FOR INTERRUPTS
069F    3E01                    MVI A,1
06A1    D322                    OUT CONTROL         ;OR BUS REQUESTS
06A3    DB21            TRUTH:  IN STATUS           ;WAIT FOR NEW SCAN
06A5    1F                      RAR
06A6    30FB                    JRNC TRUTH
06A8    DB20                    IN DATA             ;THROW AWAY FIRST FIVE
06AA    DB20                    IN DATA
06AC    DB20                    IN DATA
06AE    DB20                    IN DATA
06B0    DB20                    IN DATA
06B2    1E00                    MVI E,0             ;E WILL BE 'BUFFER'
06B4    DB20                    IN DATA             ;GET 1ST BYTE
06B6    B7                      ORA A               ;WATCH FOR NON-ZERO
06B7    203A                    JRNZ TRUTH2         ;JUMP IF ONES FOUND
06B9    DB20                    IN DATA             ;TRY REST OF FIRST 12
06BB    B7                      ORA A
06BC    2035                    JRNZ TRUTH2
06BE    DB20                    IN DATA             ;#3
06C0    B7                      ORA A
06C1    2030                    JRNZ TRUTH2
06C3    DB20                    IN DATA             ;#4
06C5    B7                      ORA A
06C6    202B                    JRNZ TRUTH2
06C8    DB20                    IN DATA             ;#5
06CA    B7                      ORA A
06CB    2026                    JRNZ TRUTH2
06CD    DB20                    IN DATA             ;#6
06CF    B7                      ORA A
06D0    2021                    JRNZ TRUTH2
06D2    DB20                    IN DATA             ;#7
06D4    B7                      ORA A
06D5    201C                    JRNZ TRUTH2
06D7    DB20                    IN DATA             ;#8
06D9    B7                      ORA A
06DA    2017                    JRNZ TRUTH2
06DC    DB20                    IN DATA             ;#9
06DE    B7                      ORA A
06DF    2012                    JRNZ TRUTH2
06E1    DB20                    IN DATA             ;#10
06E3    B7                      ORA A
06E4    200D                    JRNZ TRUTH2
06E6    DB20                    IN DATA             ;#11
06E8    B7                      ORA A
06E9    2008                    JRNZ TRUTH2
06EB    DB20                    IN DATA             ;#12
06ED    B7                      ORA A
06EE    2003                    JRNZ TRUTH2
06F0    C3 06A3                 JMP TRUTH           ;TRY NEXT SCAN IN NO FLAG
                        ;
06F3    DB20            TRUTH2: IN DATA             ;THIS SHOULD BE FF
06F5    5F                      MOV E,A             ;TO E REGISTER
06F6    DB20                    IN DATA             ;GET 2ND
06F8    A3                      ANA E               ;COMBINE
06F9    5F                      MOV E,A             ;AND SAVE
06FA    DB20                    IN DATA             ;3RD
06FC    A3                      ANA E
06FD    5F                      MOV E,A
06FE    DB20                    IN DATA             ;4TH
0700    A3                      ANA E
0701    3C                      INR A               ;CHECK FOR FF
0702    DB20                    IN DATA             ;WE IGNORE THIS BYTE
0704    C2 06A3                 JNZ TRUTH           ;LOOP IF BAD FLAG
0707    DB20                    IN DATA             ;DROP 2 MORE
0709    01 4A00                 LXI B,74*8          ;148 BLANK SCANS & CLEAR C
```

```
070C   DB20              IN DATA
070E   DB20      TRUTH3: IN DATA       ;WE WILL NOW WATCH DATA AREA
0710   B1                ORA C
0711   4F                MOV C,A
0712   DB20              IN DATA       ;WE IGNORE EVERY OTHER ONE
0714   10FC              DJNZ TRUTH3
0716   DB20              IN DATA       ;THROW AWAY 1
0718   AF                XRA A         ;GET 0
0719   B1                ORA C         ;CHECK FOR 0 DATA AREA
071A   C2 06A3           JNZ TRUTH     ;JUMP IF BITS FOUND
071D   DB20              IN DATA       ;TRY NEXT 8 FOR FLAG
071F   B7                ORA A
0720   2026              JRNZ TRUTH4
0722   DB20              IN DATA       ;#2
0724   B7                ORA A
0725   2021              JRNZ TRUTH4
0727   DB20              IN DATA       ;#3
0729   B7                ORA A
072A   201C              JRNZ TRUTH4
072C   DB20              IN DATA       ;#4
072E   B7                ORA A
072F   2017              JRNZ TRUTH4
0731   DB20              IN DATA       ;#5
0733   B7                ORA A
0734   2012              JRNZ TRUTH4
0736   DB20              IN DATA       ;#6
0738   B7                ORA A
0739   200D              JRNZ TRUTH4
073B   DB18              IN DATA       +#7
073D   B7                ORA A
073E   2008              JRNZ TRUTH4
0740   DB20              IN DATA       ;#8
0742   B7                ORA A
0743   2003              JRNZ TRUTH4
0745   C3 06A3           JMP TRUTH     ;RETRY IF NO END FLAG
0748   C9        TRUTH4: RET           ;DONE IF GOOD END FLAG
                 ;
                 ;
                 ; INDEX
                 ;
                 ; INDEX BUILDS & PRINTS INDEX ON SCREEN. IT MUST BE THE
                 ; FIRST ROUTINE RUN AFTER A NEW FICHE IS INSERTED, AS
                 ; THE OTHER PROGRAMS COUNT ON THE TABLES IT BUILDS
                 ;
0749   11 0D04   INDEX:  LXI D,HEADER  ;POINT TO TITLES
074C   0E09              MVI C,PRINT   ;PRINT THEM
074E   CD 0005           CALL BDOS
0751   CD 069E           CALL FINDFLG  ;WAIT FOR FLAG SCAN
0754   DB21      TRUTH5: IN STATUS     ;HANG FOR NEXT SCAN
0756   1F                RAR
0757   30FB              JRNC TRUTH5
0759   CD 02D4           CALL READ88   ;GET APPROX 24 TRACKS
075C   1E0B              MVI E,11      ;11 LINES
075E   D9                EXX           ;IN ALTS
075F   21 1500           LXI H,DBUF    ;POINT TO SOURCE BUFFER
0762   D9                EXX           ;BACK TO ALTS
0763   3E03      INDEX3: MVI A,3       ;BLANK LINE EVERY 4
0765   0602              MVI B,2       ;2 SCANS/LINE
0767   A3                ANA E         ;CHECK FOR 4TH LINE
0768   CC 064C           CZ CRLF       ;PUT IN SPACE IF SO
076B   D9                EXX           ;TO ORIGS
076C   23        INDEX2: INX H         ;PAST ADDRESS
076D   23                INX H
076E   23                INX H
076F   1602              MVI D,2       ;2 TITLES PER SCAN
0771   060A      INDEX5: MVI B,10      ;DATA LENGTH
0773   7E        INDEX1: MOV A,M       ;GET BYTE
0774   FE80              CPI 80H       ;NULL?
```

```
0776    2002                    JRNZ NONULL     ;JUMP IF NOT
0778    3E20                    MVI A,SPACE     ;TURN NULLS INTO SPACES
077A    4F          NONULL: MOV C,A             ;CHARACTER TO C REGISTER
077B    CD 0225             CALL KOUT           ;TO CONSOLE
077E    23                  INX H               ;POINT TO NEXT
077F    10F2                DJNZ INDEX1         ;FINISH TITLE
0781    0E20                MVI C,SPACE         ;PUT IN SPACE
0783    CD 0225             CALL KOUT
0786    0603                MVI B,3             ;THEN DO LOCATION FIELD
0788    4E          INDEX4: MOV C,M             ;TO C REGISTER
0789    23                  INX H               ;POINT TO NEXT
078A    CD 0225             CALL KOUT           ;TO CONSOLE
078D    10F9                DJNZ INDEX4         ;LOOP TILL LOCATION DONE
078F    15                  DCR D               ;1ST OR 2ND?
0790    2812                JRZ INDEX6          ;JUMP IF 2ND BLOCK OF SCAN
0792    0E20                MVI C,SPACE         ;PUT IN SEPARATOR IF 1ST
0794    CD 0225             CALL KOUT
0797    0E7C                MVI C,'|'
0799    CD 0225             CALL KOUT
079C    0E20                MVI C,SPACE
079E    CD 0225             CALL KOUT
07A1    23                  INX H               ;SKIP NULL SEPARATOR IN SCAN
07A2    18CD                JMPR INDEX5
07A4    23          INDEX6: INX H               ;POINT TO NEXT LINE
07A5    23                  INX H
07A6    D9                  EXX                 ;TO ALTS
07A7    05                  DCR B               ;DONE?
07A8    CA 07BE             JZ NXTLINE          ;JUMP IF THIS LINE DONE
07AB    0E20                MVI C,SPACE         ;PUT IN SEPARATOR
07AD    CD 0225             CALL KOUT
07B0    0E7C                MVI C,'|'
07B2    CD 0225             CALL KOUT
07B5    0E20                MVI C,SPACE
07B7    CD 0225             CALL KOUT
07BA    D9                  EXX
07BB    C3 076C             JMP INDEX2          ;LOOP TILL DONE
07BE    CD 064C     NXTLINE:CALL CRLF           ;RETURN THE CARRIAGE
07C1    1D                  DCR E               ;COUNT LINES
07C2    C2 0763             JNZ INDEX3          ;LOOP IF NOT DONE
07C5    CD 064C             CALL CRLF           ;ADD EXTRA LINE
07C8    CD 069E     SYSIND: CALL FINDFLG        ;FIND FLAG AGAIN
                        ;
                        ; WE NOW HAVE TO DELAY PAST THE INDEX SECTORS.
                        ; WE WILL DO THIS IN A SOFTWARE DELAY LOOP
                        ;
07CB    F3                  DI                  ;NO INTERRUPTS NOW
07CC    3E01                MVI A,1             ;OR BUS REQUESTS
07CE    D322                OUT CONTROL
                        ;
                        ; THE FOLLOWING EQUATES SET THE LENGTH OF THE DELAY
                        ; THEY CHANGE WITH THE ROTATION SPEED & THE TARGET
                        ; SYSTEM.
                        ;
                        ;
                        ; THERE IS 1.1332 DEGREES BETWEEN TRACKS.
                        ; THIS MEANS THERE ARE 317 TRACKS PER DISK.
                        ; AT 30 RPM, THIS IS 6309 MICROSECONDS BETWEEN TRACKS.
                        ; AT 24 RPM, THIS IS 7886 MICROSECONDS
                        ;
                            .IFN IMSAI, [
0345                    RPM30   = 837    ;21776 TCYCLES -5 /26
0416                    RPM24   = 1046   ;27206 TCYCLES -5 /26
                            ]
                            .IFN MYLAC, [
                        RPM30   = 970    ;25236 TCYCLES -5 /26
                        RPM24   = 1213   ;31544 TCYCLES -5 /26
                            ]
                        .IFN HIREVS, [
```

```
0345                        ONELINE = RPM30
                            ]
                            .IFN LOREUS, [
                            ONELINE = RPM24
                            ]
                            ;
                            ;
                                    LXI H,ONELINE*21 ;DELAY CONSTANT TO HL
07D0    21 44A9     TIMEOUT:DCX H            ; 6     ;COUNT IT
07D3    2B                  MOV A,H          ; 4     ;CHECK FOR 0
07D4    7C                  ORA L            ; 4
07D5    B5                  JRNZ TIMEOUT     ; 12/7  ;LOOP TILL DONE
07D6    20FB
                        ; WE ARE NOW NEAR THE END OF THE INDEX SCANS
                        ;
07D8    CD 02D4             CALL READ88      ;GET SCANS
07DB    21 1500             LXI H,DBUF
07DE    11 0E49             LXI D,NAMEBUF    ;BEGINNING OF DATA
07E1    3EC1        INDEX8: MVI A,'A'+80H    ;DATA FOUND?
07E3    BE                  CMP M
07E4    2806                JRZ DATALOC      ;JUMP IF SO
07E6    01 0020             LXI B,32         ;DISTANCE TO NEXT
07E9    09                  DAD B            ;POINT TO NEXT ENTRY
07EA    18F5                JMPR INDEX8      ;TRY AGAIN TILL FOUND
07EC    01 001E     DATALOC:LXI B,30         ;FOR LATER
07EF    7E                  MOV A,M          ;GET FIRST BYTE
07F0    12          INDEX9: STAX D           ;MOVE 3 BYTES
07F1    13                  INX D
07F2    23                  INX H
07F3    7E                  MOV A,M          ;#2
07F4    12                  STAX D
07F5    13                  INX D
07F6    23                  INX H
07F7    7E                  MOV A,M          ;#3
07F8    12                  STAX D
07F9    13                  INX D
07FA    09                  DAD B            ;POINT TO NEXT ENTRY
07FB    7E                  MOV A,M          ;LOOK AT FIRST
07FC    FEC1                CPI 'A'+80H      ;CHECK FOR VALID
07FE    28F0                JRZ INDEX9       ;JUMP IF STILL OK
0800    3EFF                MVI A,0FFH       ;SHOW VALID INIT
0802    32 1415             STA INITFLG
0805    21 1300             LXI H,PERROR     ;INIT THE ERROR POINTER
0808    22 1402             SHLD PCOUNT
080B    11 0DB7             LXI D,TAILER     ;POINT TO INFO MESSAGE
                            .IFN IMSAI, [
080E    3A 0003             LDA 3            ;GET I/O BYTE
0811    E603                ANI 3            ;MASK FOR CONSOLE INFO
0813    FE01                CPI 1            ;CON:=TTY:?
0815    2804                JRZ ..T1         ;PRINT NEW MESSAGE IF SO
0817    FE02                CPI 2            ;CON:=PHONE?
0819    2003                JRNZ ..T2        ;JUMP IF NOT
081B    11 0E62     ..T1:   LXI D,TAIL2      ;NEW MESSAGE
081E                ..T2:
                            ]
081E    0E09                MVI C,PRINT      ;PRINT IT
0820    CD 0005             CALL BDOS
0823    C3 028A             JMP CCP          ;DONE!!
                            ;
                            ;
                            ; GETDATA
                            ;
                            ; THIS ROUTINE FETCHES EITHER PRICE LINES
                            ; OR ASCII DATA FROM CONSOLE REQUEST
                            ;
0826    21 1418     GETDATA:LXI H,COMAND+2   ;ADD 'A' AND SHIFT RIGHT
0829    4E                  MOV C,M
```

```
082A   36C1            MVI  M,'A'+80H
082C   23              INX  H
082D   4E              MOV  B,M
082E   71              MOV  M,C
082F   AF              XRA  A              ;CLEAR ACC
0830   B6              ORA  M              ;CHECK PARITY
0831   E2 0836         JPO  ..OK1          ;JUMP IF OK
0834   CBFE            SET  7,M
0836   23        ..OK1: INX H
0837   4E              MOV  C,M
0838   70              MOV  M,B
0839   AF              XRA  A
083A   B6              ORA  M
083B   E2 0840         JPO  ..OK2
083E   CBFE            SET  7,M
0840   23        ..OK2: INX H
0841   71              MOV  M,C
0842   AF              XRA  A
0843   B6              ORA  M
0844   E2 0849         JPO  ..OK3
0847   CBFE            SET  7,M
0849   3A 1417   ..OK3: LDA COMAND+1      ;ENOUGH CHARACTERS?
084C   FE03            CPI  3
084E   3810            JRC  COMERR         ;JUMP IF TOO FEW
0850   21 1418         MOVE SNAME,COMAND+2,3  ;MOVE SCAN NAME
085B   CD 0669         CALL WHATSEC        ;WHICH ONE IS THIS?
085E   2822            JRZ  COMOK          ;JUMP IF FOUND
0860   11 0A16   COMERR: LXI D,ERRORS     ;SAY 'CANT FIND'
0863   0E09            MVI  C,PRINT
0865   CD 0005         CALL BDOS
0868   21 1418         LXI  H,COMAND+2
086B   4E              MOV  C,M
086C   CD 0225         CALL KOUT
086F   23              INX  H
0870   4E              MOV  C,M
0871   CD 0225         CALL KOUT
0874   23              INX  H
0875   4E              MOV  C,M
0876   CD 0225         CALL KOUT
0879   CD 064C         CALL CRLF
087C   CD 064C         CALL CRLF
087F   C3 028A         JMP  CCP
                  ;
0882   CD 058E   COMOK: CALL FINDSEC      ;GET IT
0885   21 1500         LXI  H,DBUF        ;POINT TO FIRST CHARACTER
0888   3EBC            MVI  A,'<'+80H     ;ASCII STRING?
088A   BE              CMP  M
088B   CA 08E6         JZ   ASCI          ;JUMP IF SO
                  ;
                  ; IT MUST BE A PRICE LINE
                  ;
088E   3A 141B   PRICE: LDA COMAND+5      ;GET EXTENSION ADDRESS
0891   E67F            ANI  7FH           ;DROP HI BIT
0893   21 1501         LXI  H,DBUF+1      ;POINT TO DATA IN LINE
0896   FE30            CPI  '0'           ;LARGE ENOUGH?
0898   38C6            JRC  COMERR        ;JUMP IF TOO SMALL
089A   FE35            CPI  '5'           ;TOO LARGE?
089C   30C2            JRNC COMERR        ;JUMP IF TOO LARGE
089E   D630            SUI  '0'           ;REMOVE ASCII BIAS
08A0   47              MOV  B,A           ;SAVE VALUE IN B
08A1   87              ADD  A
08A2   87              ADD  A             ;*4 VALUE IN ACC
08A3   80              ADD  B             ;ADD TO MAKE *5
08A4   4F              MOV  C,A           ;STORE IN C REGISTER
08A5   0600            MVI  B,0           ;CLEAR HI BYTE OF PAIR
08A7   09              DAD  B             ;ADD BASE(HL) TO OFFSET(BC)
08A8   CD 064C         CALL CRLF          ;SPACE UP 1 LINE
08AB   0E24            MVI  C,'$'         ;PUT OUT DOLLAR SIGN
08AD   CD 0225         CALL KOUT
```

```
08B0    0E20            MVI  C,SPACE       ;AND SPACE
08B2    CD 0225         CALL KOUT
08B5    0605            MVI  B,5           ;5 CHARACTERS IN FIELD
08B7    7E      XLOOP:  MOV  A,M           ;KILL LEADING 0'S
08B8    E67F            ANI  7FH           ;KILL HI BIT
08BA    FE30            CPI  '0'           ;KILL IT?
08BC    2002            JRNZ ZLOOP         ;JUMP IF DIGITS FOUND
08BE    23              INX  H             ;POINT TO NEXT
08BF    3E03            MVI  A,3           ;CHECK FOR DONE
08C1    B8              CMP  B
08C2    280E            JRZ  PRICE1        ;JUMP IF AT DECIMAL POINT
08C4    10F1            DJNZ XLOOP         ;ELSE LOOP
08C6    4E      ZLOOP:  MOV  C,M           ;GET CHARACTER
08C7    CD 0225         CALL KOUT          ;PRINT IT
08CA    23      ZLOOP2: INX  H             ;POINT TO NEXT
08CB    3E03            MVI  A,3           ;AT DECIMAL POINT YET?
08CD    B8              CMP  B
08CE    2802            JRZ  PRICE1        ;JUMP IF SO
08D0    10F4            DJNZ ZLOOP
;
08D2    0E2E    PRICE1: MVI  C,'.'         ;PUT OUT DECIMAL POINT
08D4    CD 0225         CALL KOUT
08D7    4E      PRICE2: MOV  C,M           ;GET LAST 2 TO CONSOLE
08D8    CD 0225         CALL KOUT
08DB    23              INX  H
08DC    4E              MOV  C,M
08DD    CD 0225         CALL KOUT
08E0    CD 064C         CALL CRLF          ;SPACE UP TO NEXT LINE
08E3    C3 028A         JMP  CCP           ;AND CONTINUE
;
;
08E6    061A    ASCI:   MVI  B,26          ;MAXIMUM FIELD LENGTH
08E8    23      ASCI1:  INX  H             ;POINT TO NEXT
08E9    4E              MOV  C,M           ;GET ASCII CHARACTER
08EA    79              MOV  A,C           ;COPY TO A
08EB    FE3E            CPI  '>'           ;ARE WE DONE?
08ED    282D            JRZ  ADONE         ;JUMP IF SO
08EF    FE26            CPI  '&'           ;CONTINUE FLAG?
08F1    2805            JRZ  ANEXT         ;CONTINUE TO NEXT IF SO
08F3    CD 0225         CALL KOUT          ;PRINT IF OK
08F6    10F0            DJNZ ASCI1         ;FALL THRU IF DONE
08F8    0E20    ANEXT:  MVI  C,SPACE       ;TURN AMPERSTAND TO SPACE
08FA    CD 0225         CALL KOUT
08FD    2A 1404         LHLD SECNO         ;GET PRESENT SECTOR #
0900    23              INX  H             ;POINT TO NEXT
0901    E5              PUSH H             ;SAVE VALUE
0902    29              DAD  H             ;*2
0903    EB              XCHG               ;TO D-E
0904    E1              POP  H             ;RESTORE ORIG VALUE
0905    19              DAD  D             ;*3 TO HL
0906    11 0E49         LXI  D,NAMEBUF     ;BASE ADDR TO DE
0909    19              DAD  D             ;ADD TO OFFSET
090A    11 1406         LXI  D,SNAME       ;DESTINATION
090D    01 0003         LXI  B,3           ;TITLE LENGTH
0910    EDB0            LDIR               ;MOVE TO NAME BUFFER
0912    CD 058E         CALL FINDSEC       ;GET SECTOR
0915    21 14FF         LXI  H,DBUF-1      ;POINT TO START OF TEXT
0918    061B            MVI  B,27          ;NEW FIELD LENGTH
091A    18CC            JMPR ASCI1         ;PRINT IT
091C    CD 064C ADONE:  CALL CRLF          ;SPACE UP 1 LINE
091F    C3 028A         JMP  CCP           ;& DO NEXT COMMAND
;
;
; CONSWAP
;
; THIS ROUTINE TOGGLES THE CONSOLE ASSIGN BETWEEN
; THE VK1: AND THE CRT:
;
.IFN DEMO, [
```

```
0922    3A 0003         CONSWAP:LDA 3           ;GET I/O BYTE
0925    4F                      MOV C,A         ;SAVE IN C REG
0926    E603                    ANI 3           ;MASK FOR CONSOLE ASSIGN
0928    FE03                    CPI 3           ;IS IT VK1:?
092A    3EFC                    MVI A,0FCH      ;MOVE IN MASK FOR LATER
092C    2809                    JRZ VK1CON      ;JUMP IF VK1: NOW
092E    A1                      ANA C           ;GET REST OF I/O BYTE
092F    F603                    ORI 3           ;FORCE TO VK1:
0931    32 0003                 STA 3           ;UPDATE TO MEMORY
0934    C3 028A                 JMP CCP         ;& CONTINUE
0937    A1              VK1CON: ANA C           ;RECOVER REST OF I/O BYTE
0938    F601                    ORI 1           ;FORCE TO CRT:
093A    32 0003                 STA 3           ;UPDATE TO MEMORY
093D    C3 028A                 JMP CCP         ;& CONTINUE
```

```
;************************************
;*                                  *
;*      ASCII MESSAGE STORAGE       *
;*                                  *
;************************************
```

```
0940                    ERROR1:
                                .ASCII '
0940    0D0A46494E44    FINDSEC ERROR
094F    0D0A44455349    DESIRED = $'

095C                    ERROR2:
                                .ASCII '
095C    0D0A31535420    1ST RETRIEVED = $ '

0970                    ERROR3:
                                .ASCII '
0970    0D0A56414C49    VALID SCANS = $'

0981                    ERROR4:
                                .ASCII '
0981    0D0A50415249    PARITY ERROR OVERFLOW
0998    0D0A
099A    0D0A42595445    BYTE# VAL SECTOR
09AC    0D0A24          $'
09AF                    ERROR5:
                                .ASCII '
09AF    0D0A494E4445    INDEX TRUTH TABLE ERROR
09C8    0D0A24          $'
09CB                    ERROR6:
                                .ASCII '
09CB    0D0A46495253    FIRSTSEC ERROR
09DB    0D0A43414E54    CANT FIND SECTOR NAME $'

09F4                    ERROR7:
                                .ASCII '
09F4    0D0A494E4445    INDEX ROUTINE CANT FIND INDEX
0A13    0D0A24          $'
0A16                    ERROR8:
                                .ASCII '
0A16    0D0A43414E54    CANT FIND TRACK $'

0A29                    NOINDEX:
                                .ASCII '
0A29    0D0A594F5520    YOU HAVE NOT INDEXED THIS DISK YET!
0A4E    0D0A
0A50    0D0A20285072     (Press "I", then "RETURN")
0A6D    0D0A
0A6F    0D0A24          $'

0A72                    HELLO:
                                .ASCII '
```

```
0A72    0D0A                                  NLI OPTICAL DATA SYSTEM
0A74    0D0A20202020                          ---------------
0AA5    0D0A2D2D2D2D
0ACC    0D0A20202020
0AF3    0D0A
0AF5    0D0A
0AF7    0D0A2020202A        * Type "I", then "RETURN" to bring up the INDEX.
0B2D    0D0A
0B2F    0D0A2020202A        * Type the 3-Character "KEY" , then "RETURN" to re
                        ieve selected info.'
                        .ASCII '
0B7C    0D0A
0B7E    0D0A2020202A        * Type "O", then "RETURN" to QUIT.
0BA6    0D0A
0BA8    0D0A24              $'
                        ;
                        .IFN IMSAI, [
0BAB                    HELLO1:
                             .ASCII '
0BAB    0D0A
0BAD    0D0A20202020                          NLI OPTICAL DATA SYSTEM
0BDA    0D0A
0BDC    0D0A
0BDE    0D0A20202020                                DIRECTIONS
0C05    0D0A20202020                                ---------
0C2C    0D0A
0C2E    0D0A
0C30    0D0A2020202A        * Type "I", then "CR" to bring up the INDEX.
0C62    0D0A
0C64    0D0A2020202A        * Type the 3-Character "KEY" , then "CR" to retrie
                        selected info.'
                        .ASCII '
0CAD    0D0A
0CAF    0D0A2020202A        * Type "O", then "CR" to QUIT.
0CD3    0D0A
0CD5    0D0A24              $'
                        ]
0CD8                    PROMPT:
                             .ASCII '
0CD8    0D0A434F4D4D  COMMAND >$'
                        ;
0CE4                    INVALID:
                             .ASCII '
0CE4    0D0A54484154  THAT IS NOT A VALID COMMAND
0D01    0D0A24              $'
                        ;
                        ;
0D04                    HEADER:
                             .ASCII '
0D04    0D0A20202020                     DISK 1 INDEX
0D2C    0D0A
0D2E    0D0A20495445  ITEM #     KEY     ITEM #     KEY     ITEM #     KEY     IT
                        #    KEY
0D71    0D0A202D2D2D  ------    ---     ------     ---     ------     ---      --
                        --    ---
0DB7                    TAILER:
                             .ASCII '
0DB7    0D0A20546F20  To retrieve information, type the 3-character "KEY", t
                        en "RETURN".
0DFD    0D0A
0DFF    0D0A24              $'
                        ;
                        .IFN IMSAI, [
0E02                    TAIL2:
                             .ASCII '
```

```
0E02    0D0A20546F20    ;   To retrieve information; type the 3-character "KEY",
                                en "CR".
0E44    0D0A            ;
0E46    0D0A24          $'
                        ]
                        ;
                        ;
                        ;
                        ;
                        ;
                        ;++++++++++++++++++++++++++++++++++++++++
                        ;+      MEMORY STORAGE EQUATES          +
                        ;++++++++++++++++++++++++++++++++++++++++
                        ;
                        ;
0E49                    NAMEBUF:.BLKB TRACKS * 3        ;3 BYTE NAMES
                        ;
1300                    .LOC . & 0FF00H + 100H          ;TO PAGE BORDER
                        ;
1300                    PERROR: .BLKB 64 * 4            ;PARITY ERROR BUFFER
                        ;
1400                    DPOINT: .BLKB 1
                        ;
1401                    BUFNO:  .BLKB 1                 ;CURRENT BUFFER OFFSET
                        ;
1402                    PCOUNT: .BLKB 1                 ;SET UP COUNTER
                        ;
1404                    SECNO:  .BLKW 1                 ;CURRENT SECTOR # STORAGE
                        ;
1406                    SNAME:  .BLKW 3                 ;CURRENT SECTOR NAME
                        ;
140C                    BASE:   .BLKW 1                 ;16 BIT COUNTER STORAGE
                        ;
140E                    BYTENO: .BLKB 1                 ;8 BIT COUNTER STORAGE
                        ;
140F                    PIXLOC: .BLKW 1                 ;PIXEL POINTER
                        ;
1411                    BITBUF: .BLKW 1                 ;BIT POINTER
                        ;
1413                    FIRSTSEC:.BLKW 1                ;TEMP STORAGE FOR ERROR ROUTIN
                        ;
1415                    INITFLG:.BLKB 1                 ;INDEXING FLAG
                        ;
1416                    COMAND: .BLKB 18                ;INPUT LINE BUFFER
                        ;
1500                    .LOC . & 0FF00H + 100H          ;TO PAGE BORDER
                        ;
1500                    DBUF:   .BLKB 400H              ;1 K LONG
                        ;
1900                    INBUF:  .BLKB 5800H             ;22 K LONG
                        ;
0000'                   MAPEND: .END START
+++++ SYMBOL TABLE +++++
```

| | | | | | | | |
|---|---|---|---|---|---|---|---|
| ADONE | 091C | ANEXT | 08F8 | ASCHEX | 0661 | ASCI | 08E6 |
| ASCII1 | 08E8 | BASE | 140C | BDOS | 0005 | BEGIN | 0200 |
| BEGIN1 | 024A | BETR1 | 0568 | BETTER | 0569 | BITBUF | 1411 |
| BOT1 | 0498 | BOT2 | 04BF | BOT3 | 04C2 | BOT9 | 04AB |
| BOTFIN | 048C | BOTFOU | 04B2 | BOTLOO | 049E | BS | 0008 |
| BUFNO | 1401 | BYTENO | 140E | CCP | 028A | CCP1 | 02BD |
| CENABL | FFFF | CHEAT | 0324 | CHEAT1 | 0336 | CHEAT2 | 033F |
| CHEAT3 | 0347 | CHEAT4 | 034F | CHEAT5 | 0357 | CHEAT6 | 035F |
| CHEAT7 | 036A | CHEAT8 | 0373 | CHEAT9 | 032E | CKLOOP | 0582 |
| CLOOP1 | 0588 | CLOSE | 0010 | COMAND | 1416 | COMERR | 0660 |
| COMOK | 0882 | CONFIG | 0092 | CONIN | 0001 | CONOUT | 0002 |
| CONRDY | 000B | CONSWA | 0922 | CONT1 | 043A | CONT2 | 0446 |
| CONT3 | 0452 | CONT4 | 0416 | CONT5 | 0422 | CONT6 | 042E |
| CONTRO | 0022 | CR | 000D | CRLF | 064C | CRLOOP | 0287 |

| Label | Addr | Label | Addr | Label | Addr | Label | Addr |
|---|---|---|---|---|---|---|---|
| DATA | 0020 | DATALO | 07EC | DBUF | 1500 | DECODE | 0471 |
| DELETE | 0013 | DEMO | FFFF | DLENGT | 001E | DPOINT | 1400 |
| ERROR1 | 0940 | ERROR2 | 095C | ERROR3 | 0970 | ERROR4 | 0981 |
| ERROR5 | 09AF | ERROR6 | 09CB | ERROR7 | 09F4 | ERROR8 | 0A16 |
| ESC | 001B | ETX | 0003 | FALSE | 0000 | FINDFL | 0E9E |
| FINDSE | 058E | FIRSTS | 1413 | FLAG | 0378 | FOUNDI | 05F2 |
| FSEC1 | 059A | FSEC2 | 0602 | GARBAG | 0406 | GETDAT | 0826 |
| GOHOME | 0546 | GOODO | 03C3 | GOOD1 | 03CB | GOODON | 04C6 |
| HASC1 | 065E | HEADER | 0D04 | HELLO | 0A72 | HELLO1 | 0EAE |
| HEXASC | 0656 | HIREVS | FFFF | IMSAI | FFFF | INBUF | 1900 |
| INDEX | 0749 | INDEX1 | 0773 | INDEX2 | 076C | INDEX3 | 0763 |
| INDEX4 | 0788 | INDEX5 | 0771 | INDEX6 | 07A4 | INDEX8 | 07E1 |
| INDEX9 | 07F0 | INITFL | 1415 | INLINE | 000A | INVALI | 0CE4 |
| KDATA | 0222 | KFINE | 023D | KOUT | 0225 | KSHIT | 023B |
| KSTAT | 021F | KVEC | 0241 | LF | 000A | LISTER | 0247 |
| LISTOU | 0005 | LOREVS | 0000 | MAKE | 0016 | MAPEND | 7100 |
| MAPLEN | ?000 | MATCH1 | 0688 | MATCH2 | 0692 | MULT | 05A2 |
| MAMEPU | 0E49 | NEXT1 | 044A | NEXT2 | 043E | NEXT3 | 0432 |
| NEXT4 | 042C | NEXT5 | 041A | NEXT6 | 040D | NEXTPA | 047A |
| NOGDI | 05A7 | NOGOOD | 05DA | NOINDE | 0A29 | NONULL | 077A |
| NOCEC | 067F | NOSPAC | 025E | NULL | 0000 | NXTDON | 0466 |
| NXTLIN | 07BE | NYLAC | 0000 | NYLCRT | F080 | ONELIN | 0345 |
| OPEN | 000F | PAR1 | 062E | PARBAD | 060C | PARITY | 0607 |
| PAPOV | 062F | PCHECK | 057B | PCOUNT | 1402 | PERROR | 1300 |
| PHEX | 0633 | PHEX1 | 0638 | PIXLOC | 140F | PIXLOO | 0312 |
| PRICE | 088E | PRICE1 | 08D2 | PRICE2 | 08D7 | PRINT | 0009 |
| PROMPT | 0CD8 | PSTART | 0322 | PUTA | 0464 | PUTIN | 045C |
| PUTONE | 045B | PUTZER | 0457 | QLOOP | 05C5 | RDHANG | 02F2 |
| RDLOOP | 02F8 | READ | 0014 | READ1 | 02E3 | READ16 | 02E0 |
| READ4 | 02DA | READ88 | 02D4 | RENAME | 0017 | RESET | 0552 |
| RESTAR | 02EF | RPM24 | 0416 | RPM30 | 0345 | RUBOUT | 007F |
| SAME | 054A | SAME1 | 055B | SCANS | 00D4 | SCHECK | 0519 |
| SCRN | F000 | SEARCH | 0011 | SECNO | 1404 | SETBUF | 001A |
| SETUP | 0023 | SHIFT | 0508 | SHIFT0 | 04EA | SHIFT1 | 0501 |
| SHIFT2 | 04F4 | SHIFT3 | 04D6 | SL10 | 03D3 | SL11 | 03F2 |
| SL20 | 03DD | SNAME | 1406 | SPACE | 0020 | SR10 | 03FB |
| SR11 | 03E7 | STACK | 7300 | START | 0000' | STATUS | 0021 |
| STX | 0002 | SYSIND | 07C8 | TAIL2 | 0E02 | TAILER | 0DB7 |
| TESTIT | 0386 | TIMEOU | 07D3 | TRACKS | 013D | TRUE | FFFF |
| TRUTH | 06A3 | TRUTH2 | 06F3 | TRUTH3 | 070E | TRUTH4 | 0748 |
| TRUTH5 | 0754 | US | 001F | VIO | F000 | VKICON | 0937 |
| WAIT | 05B2 | WHATSE | 0669 | WLOOP | 066E | WNEXT | 0677 |
| WRITE | 0015 | XLOOP | 08B7 | ZLOOP | 08C6 | ZLOOP2 | 08CA |
| .BLNK. | 0000:03 X | .DATA. | 0000* X | .PROG. | 0003' X | | |

It was disclosed above that the radially oriented data could be stored skewed so that the data could be scanned such that the sensor could be skewed or a light beam could be radially displaced across the data line within the time of the skew as defined by the speed or rotation of the disc. In addition, we have determined that the data may be stored, generally radially, but extending more specifically in arcuate lines so that the scanner is constructed either in an arcuate form or includes a beam which travels radially and circumferentially, that is in a radially, arcuately directed manner. In other words, the light beam, for a flying spot scanner, would sweep radially and circumferentially so as to scan an arcuate radial line of data.

Of course, faster data retrieval is obtained through the use of a constantly rotating disc. Therefore, scanning in accordance with a skewed data format, an arcuate data format or a circular data format is preferred to start-stop operation. It is readily apparent, however, that a continuous rotation cannot be employed for the projection of graphic information unless the projected image is first stored and then reproduced.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:
1. An information record comprising:
   a circular body including a peripheral edge and adapted for rotation about an axis;
   optically retrievable information carried by said body in radial lines between said axis and said peripheral edge; and
   address information carried by said body identifying locations of respective portions of said optically retrievable information,
   said address information including a plurality of line addresses each located within a respective line of said optically retrievable information.

2. The information record of claim 1, wherein:
each address is located adjacent an end of the respective line.

3. The information record of claim 1, wherein:
each address is dispersed in the respective line.

4. The information record of claim 1, wherein:
said optically retrievable information and said address information comprise digital data.

5. An information record comprising:
a circular body including a peripheral edge and adapted for rotation about an axis;
optically retrievable information carried by said body in radial lines between said axis and said peripheral edge, said optically retrievable information comprising a plurality of discrete graphic microimages; and
address information carried by said body identifying the locations of respective portions of said optically retrievable information.

6. The information record of claim 5, wherein:
said address information includes a plurality of addresses assigned to respective microimages and each located adjacent said peripheral edge at a predetermined angle from the respective microimage.

7. The information record of claim 5, wherein:
said optically retrievable information further comprises radially extending lines of digitial information.

8. An information record comprising:
a microfiche body having an axis of rotation;
a plurality of rows of information carried by said microfiche body and extending radially of the axis of rotation; and
each of said rows of information comprising first information and second information as an address of said first information.

9. The information record of claim 8, wherein:
said disc is a microfilm body; and
said information is comprises optically stored digital data.

10. The information record of claim 8, wherein:
said disc is constructed of a light impermeable material; and
said information is digital data of a character to be read by light reflection.

11. The information record of claim 8, wherein:
said disc is constructed of a thermoplastic material; and
said information is digital information stored to provide areas of light refraction.

12. The information record of claim 8, wherein:
said microfiche body comprises a circular disc having a peripheral edge;
said first information located adjacent said peripheral edge.

* * * * *